(12) United States Patent
Schings

(10) Patent No.: US 12,478,374 B2
(45) Date of Patent: Nov. 25, 2025

(54) INTELLIGENT ANVIL INSERT FOR LINEAR SURGICAL STAPLER

(71) Applicant: Cilag GmbH International, Zug (CH)

(72) Inventor: Brian D. Schings, Maineville, OH (US)

(73) Assignee: CILAG GMBH INTERNATIONAL, Zug (CH)

( * ) Notice: Subject to any disclaimer, the term of this patent is extended or adjusted under 35 U.S.C. 154(b) by 0 days.

(21) Appl. No.: 18/500,693

(22) Filed: Nov. 2, 2023

(65) Prior Publication Data
US 2025/0143699 A1 May 8, 2025

(51) Int. Cl.
*A61B 17/072* (2006.01)
*A61B 17/00* (2006.01)

(52) U.S. Cl.
CPC .......... *A61B 17/07207* (2013.01); *A61B 2017/00119* (2013.01); *A61B 2017/00734* (2013.01); *A61B 2017/07257* (2013.01); *A61B 2017/07271* (2013.01)

(58) Field of Classification Search
CPC .... A61B 17/07207; A61B 2017/00119; A61B 2017/00734; A61B 2017/07257; A61B 2017/07271
USPC ...................................... 227/175.1
See application file for complete search history.

(56) References Cited

U.S. PATENT DOCUMENTS

| | | | |
|---|---|---|---|
| 5,014,899 A * | 5/1991 | Presty .............. | A61B 17/07207 227/19 |
| 5,464,144 A * | 11/1995 | Guy .................... | A61B 17/115 227/176.1 |
| 6,843,403 B2 * | 1/2005 | Whitman ......... | A61B 17/07207 227/176.1 |
| 8,763,879 B2 * | 7/2014 | Shelton, IV ........... | A61B 34/76 227/19 |
| 9,345,481 B2 * | 5/2016 | Hall .................. | A61B 17/07207 |
| 10,898,187 B2 | 1/2021 | Deck et al. | |
| 11,033,266 B2 | 6/2021 | Jones et al. | |
| 11,045,193 B2 | 6/2021 | Schings et al. | |
| 11,229,433 B2 | 1/2022 | Schings et al. | |
| 11,278,285 B2 | 3/2022 | Deck et al. | |
| 11,571,212 B2 * | 2/2023 | Yates ...................... | A61B 18/18 |
| 11,696,760 B2 * | 7/2023 | Shelton, IV ....... | A61B 18/1445 227/180.1 |
| 2005/0131390 A1 | 6/2005 | Heinrich et al. | |

(Continued)

OTHER PUBLICATIONS

European Extended Search Report and Written Opinion dated Dec. 5, 2024, for Application No. 24209379.7, 10 pages.

*Primary Examiner* — Michelle Lopez
(74) *Attorney, Agent, or Firm* — FROST BROWN TODD LLP

(57) ABSTRACT

A surgical stapler includes an elongate cartridge channel, an anvil assembly, a clamp member and a deflection sensor. The elongate cartridge channel includes a proximal frame portion and a distal jaw portion. The distal jaw portion is configured to releasably receive a staple cartridge. The anvil assembly includes an elongate anvil channel and an anvil insert. The elongate anvil channel includes a proximal frame portion and a distal jaw portion. The anvil insert is disposed at the distal jaw portion. The deflection sensor is associated with the anvil assembly and is configured to detect deflection of the anvil assembly to facilitate generation of a notification as a function of the detected deflection.

19 Claims, 22 Drawing Sheets

(56) References Cited

U.S. PATENT DOCUMENTS

| | | | |
|---|---|---|---|
| 2006/0273135 A1* | 12/2006 | Beetel | A61B 17/128 227/175.1 |
| 2011/0036891 A1* | 2/2011 | Zemlok | A61B 17/07207 227/176.1 |
| 2015/0083731 A1* | 3/2015 | Skopis | A47J 36/022 220/573.4 |
| 2019/0000446 A1* | 1/2019 | Shelton, IV | A61B 17/0682 |
| 2019/0000448 A1* | 1/2019 | Shelton, IV | A61B 17/0682 |
| 2020/0093487 A1* | 3/2020 | Baber | H02J 1/10 |
| 2022/0142641 A1 | 5/2022 | Wang | |
| 2022/0387031 A1* | 12/2022 | Yates | A61B 17/07207 |
| 2022/0406452 A1* | 12/2022 | Shelton, IV | A61B 34/37 |
| 2023/0255628 A1* | 8/2023 | Harris | A61B 17/2909 227/176.1 |
| 2023/0397911 A1 | 12/2023 | Deck et al. | |

\* cited by examiner

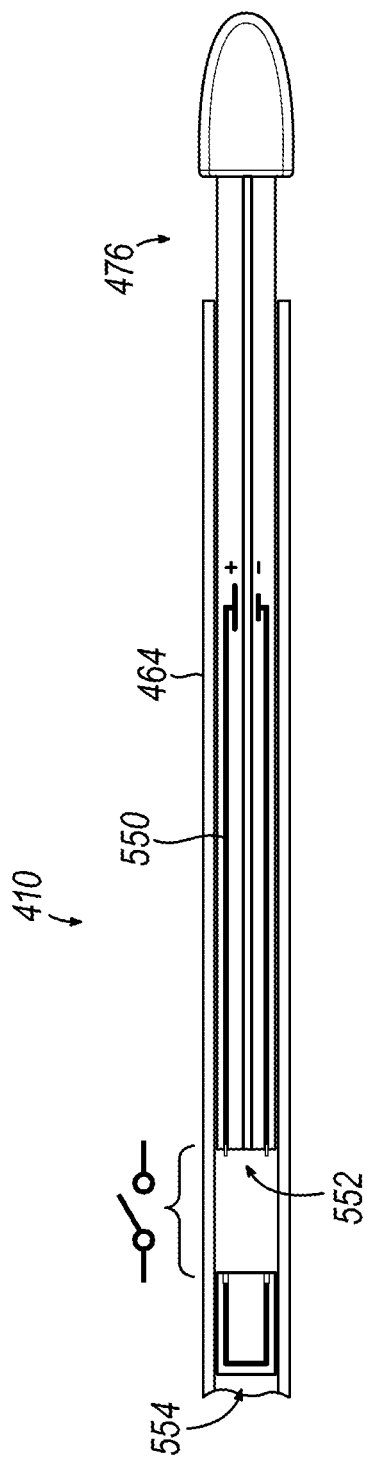
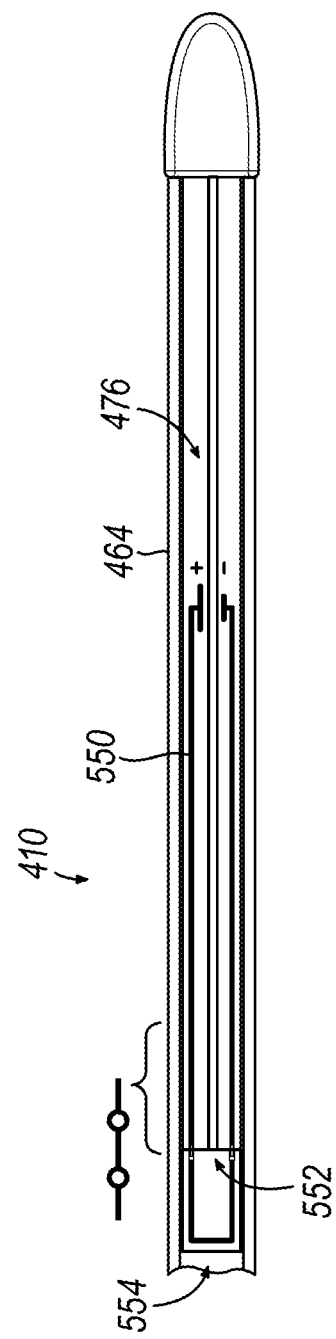

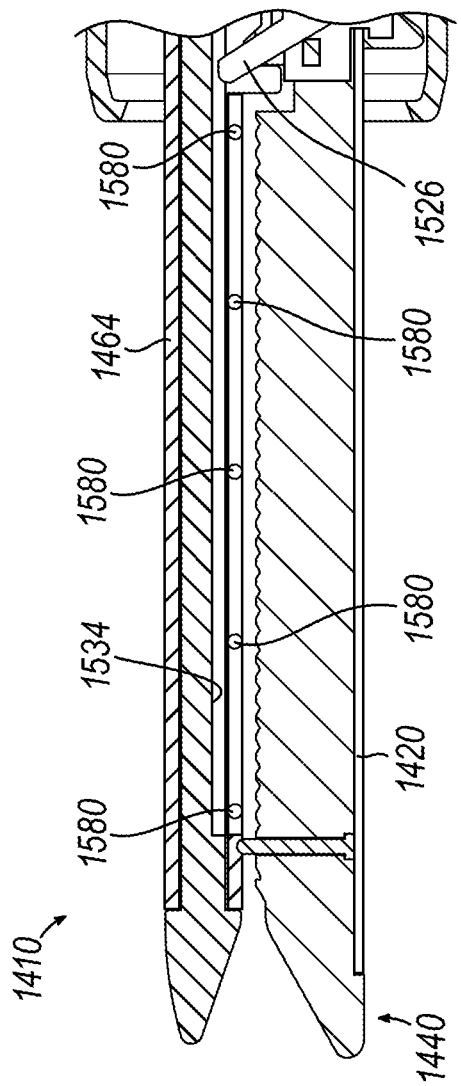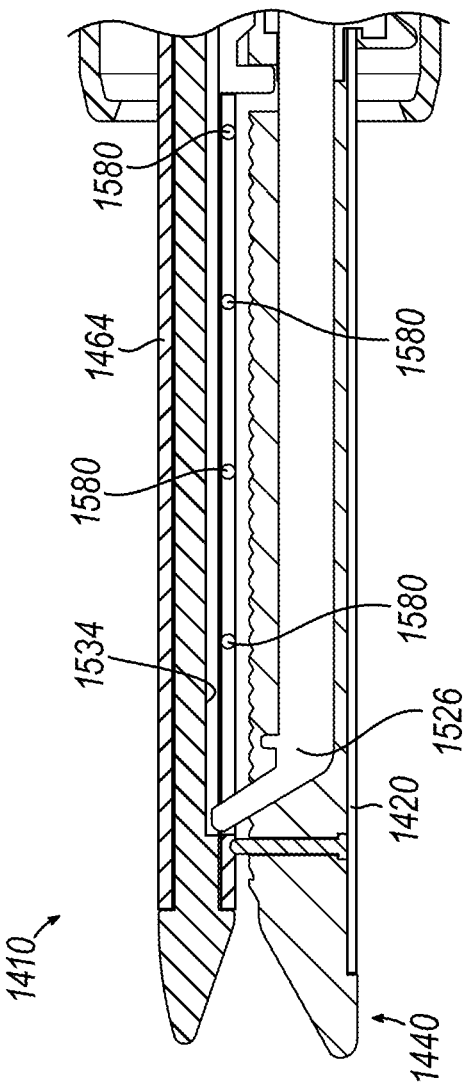

INTELLIGENT ANVIL INSERT FOR LINEAR SURGICAL STAPLER

BACKGROUND

In some surgical operations, such as a gastrointestinal anastomosis, it may be desirable to clamp down on one or more layers of tissue, cut through the clamped layers, and simultaneously drive staples through the layers to substantially seal the severed layers together near their severed ends. One such instrument that may be used in such operations is a linear surgical stapler, also referred to as a "linear cutter." A linear surgical stapler generally includes a first half (referred to as a "cartridge half" or "reload half") having a distal jaw configured to support a staple cartridge (or "reload"), and a second half (referred to as an "anvil half") having a distal jaw that supports an anvil surface having staple forming features. The stapler further includes a movable clamp lever configured to releasably clamp the stapler halves together. The stapler halves are configured to releasably couple together and pivot relative to one another to clamp tissue positioned between the two distal jaws when the clamp lever is closed. A firing assembly of the stapler is configured to be actuated to cut the clamped layers and simultaneously drive staples through the tissue on either side of the cut line. After the stapler is fired, the clamp lever may be opened, and the stapler halves separated to release the severed and stapled tissue.

While various kinds of surgical stapling instruments and associated components have been made and used, it is believed that no one prior to the inventor(s) has made or used the invention described in the appended claims.

BRIEF DESCRIPTION OF THE DRAWINGS

The accompanying drawings, which are incorporated in and constitute a part of this specification, illustrate embodiments of the invention, and, together with the general description of the invention given above, and the detailed description of the embodiments given below, serve to explain the principles of the present invention.

FIG. 16 depicts a partially schematic enlarged bottom plan view of a distal end of another illustrative linear surgical stapler with an anvil insert shown partially installed;

FIG. 17 depicts a partially schematic enlarged bottom plan view of the linear surgical stapler of FIG. 16, but with the anvil insert fully installed;

FIG. 22 depicts an enlarged sectional view of distal jaw portions of another illustrative linear surgical stapler having a knife member in a retracted position; and FIG. 23 depicts an enlarged sectional view of distal jaw portions of the linear surgical stapler of FIG. 22 but with the knife member in an extended position.

Figure 1:
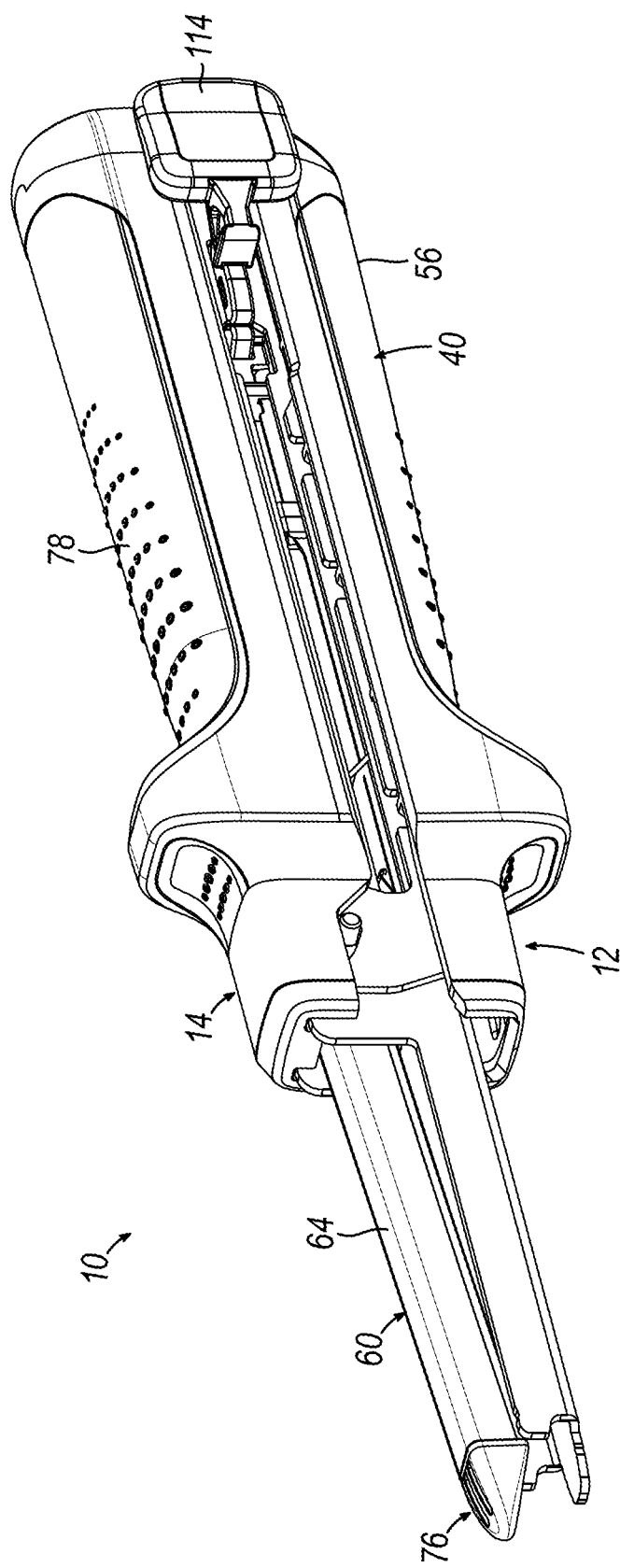
FIG. 1 depicts a perspective view of an illustrative linear surgical stapler, showing a cartridge half and an anvil half of the stapler coupled together with a clamp lever of the cartridge half in a fully closed position.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

For clarity of disclosure, the terms "proximal" and "distal" are defined herein relative to a surgeon, or other operator, grasping a surgical instrument having a distal surgical end effector. The term "proximal" refers to the position of an element arranged closer to the surgeon, and the term "distal" refers to the position of an element arranged closer to the surgical end effector of the surgical instrument and further away from the surgeon. Moreover, to the extent that spatial terms such as "upper," "lower," "vertical," "horizontal," or the like are used herein with reference to the drawings, it will be appreciated that such terms are used for illustrative description purposes only and are not intended to be limiting or absolute. In that regard, it will be understood that surgical instruments such as those disclosed herein may be used in a variety of orientations and positions not limited to those shown and described herein.

Furthermore, the terms "about" and "approximately" as used herein in connection with any numerical values or ranges indicate a suitable dimensional tolerance that allows the referenced feature(s) to function for its intended purpose as described herein.

I. Illustrative Linear Surgical Stapler

A. Overview of Linear Surgical Stapler

Figure 2:
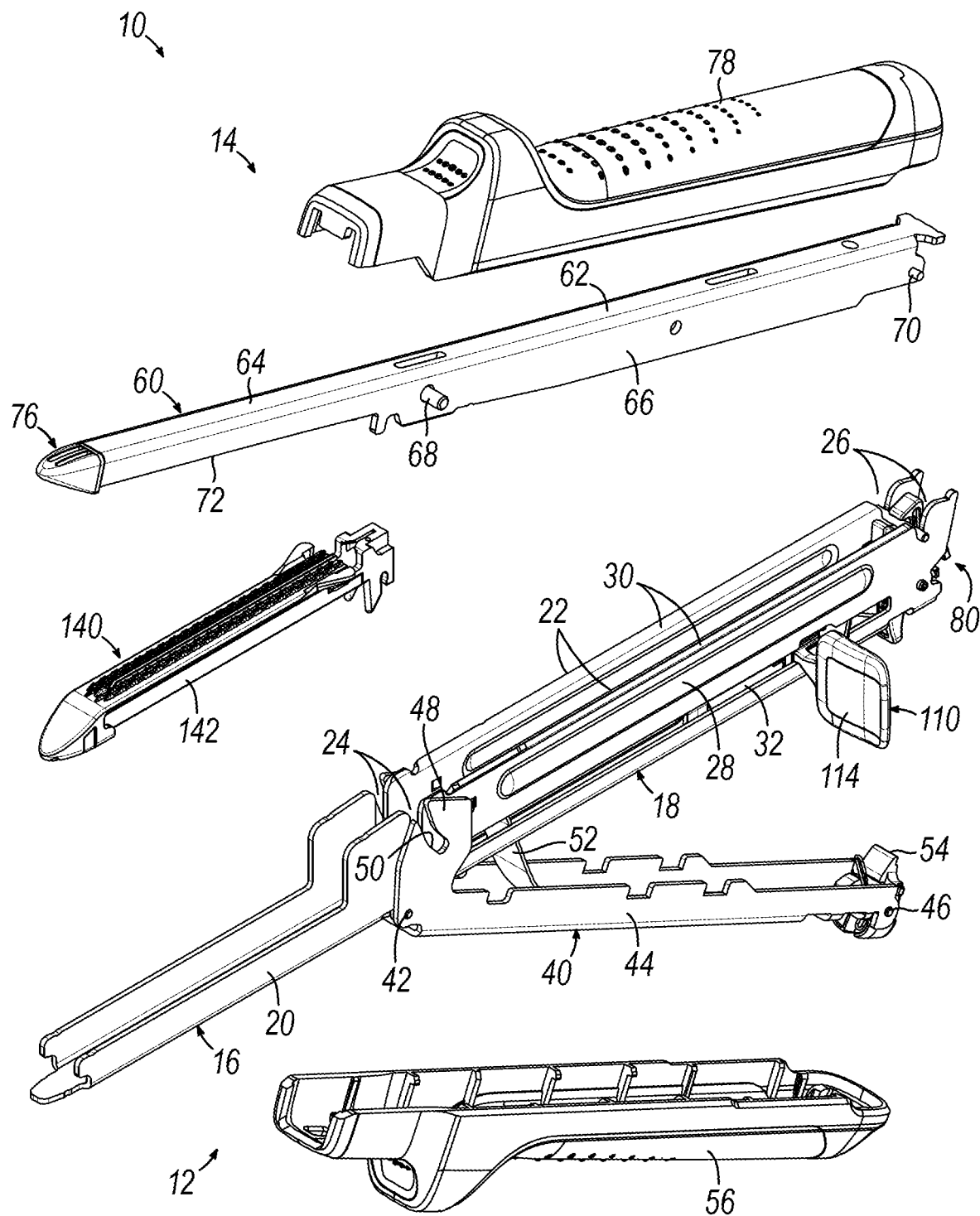
FIG. 2 depicts an exploded perspective view of the linear surgical stapler of FIG. 1, additionally showing a staple cartridge.

FIGS. 1-2 show an illustrative linear surgical stapler (10) (also referred to as a "linear cutter") suitable for use in a variety of cutting and stapling procedures, such as a gastrointestinal anastomosis procedure. Linear surgical stapler (10) includes a pair of elongate bodies in the form of a cartridge half (12) (also referred to as a "reload half") and an anvil half (14) configured to releasably couple together to clamp tissue therebetween for simultaneous cutting and stapling of the clamped tissue.

Cartridge half (12) includes a first elongate member in the form of an elongate cartridge channel (16) having a proximal frame portion (18) and a distal jaw portion (20). Proximal frame portion (18) slidably retains a firing assembly (110) and includes a laterally opposed pair of upright side flanges (22). Each side flange (22) includes a vertical slot (24) arranged at a distal end thereof, and a tapered notch (26) arranged at a proximal end thereof. An outwardly projecting stiffening rib (28) extends longitudinally between the distal slot (24) and proximal notch (26) of each side flange (22) and is configured to provide the side flange (22) with enhanced stiffness. An outwardly flared upper segment (30) defines an upper edge of a proximal portion of each side flange (22) and is configured to facilitate receipt of anvil half (14) by cartridge half (12). Each side flange (22) further includes an elongate firing slot (32) extending longitudinally between proximal notch (26) and distal slot (24) along a lower side of side flange (22). Elongate firing slots (32) are configured to guide firing assembly (110) between proximal and distal positions. Firing assembly (110) is described in greater detail below in connection with FIG. 8.

Figure 4:
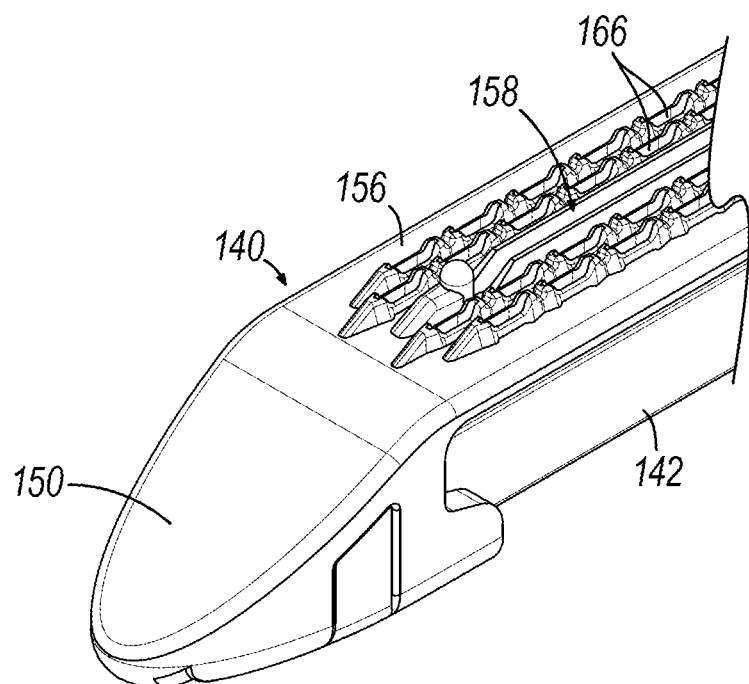
FIG. 4 depicts a perspective view of a distal end portion of the staple cartridge of FIG. 2.

Distal jaw portion (20) of cartridge channel (16) is configured to releasably receive a staple cartridge (140) (or "reload"). As shown in FIG. 4, staple cartridge (140) includes a cartridge body (142) having an upper side that defines a first stapling surface in the form of a deck (156) having a plurality of staple openings (166) that house a plurality of staples (168) and corresponding staple drivers (172).

Cartridge half (12) further includes a clamp member in the form of a clamp lever (40) (also referred to as a "clamp arm" or "latch lever") pivotably coupled to cartridge channel (16) with a clamp lever pivot pin (42), which is arranged in approximate alignment with distal slots (24) of cartridge channel side flanges (22). Clamp lever (40) includes an elongate lever arm (44) having a free proximal end (46) and a distal end that is pivotably coupled to a lower portion of cartridge channel (16) with pivot pin (42). A pair of opposed jaws (48) extend distally from the distal end of lever arm (44) alongside cartridge channel side flanges (22). Each jaw (48) includes a curved slot (50) having a closed proximal end and an open distal end configured to receive a latch pin (68) of anvil half (14), as described below.

Figure 9A:
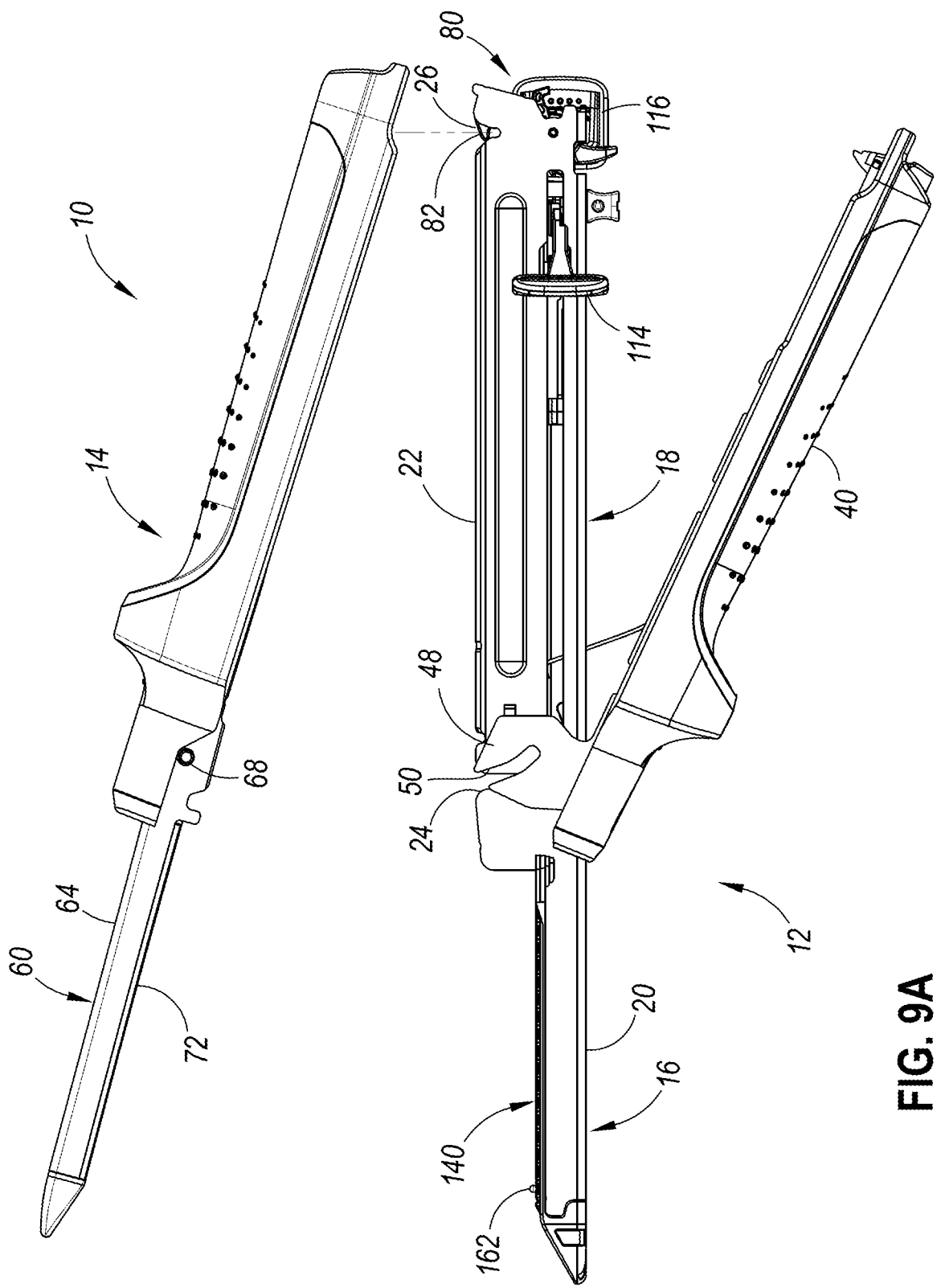
FIG. 9A depicts a side elevational view of the linear surgical stapler of FIG. 1, showing the stapler halves separated from one another with the clamp lever in the open position.
Figure 9B:
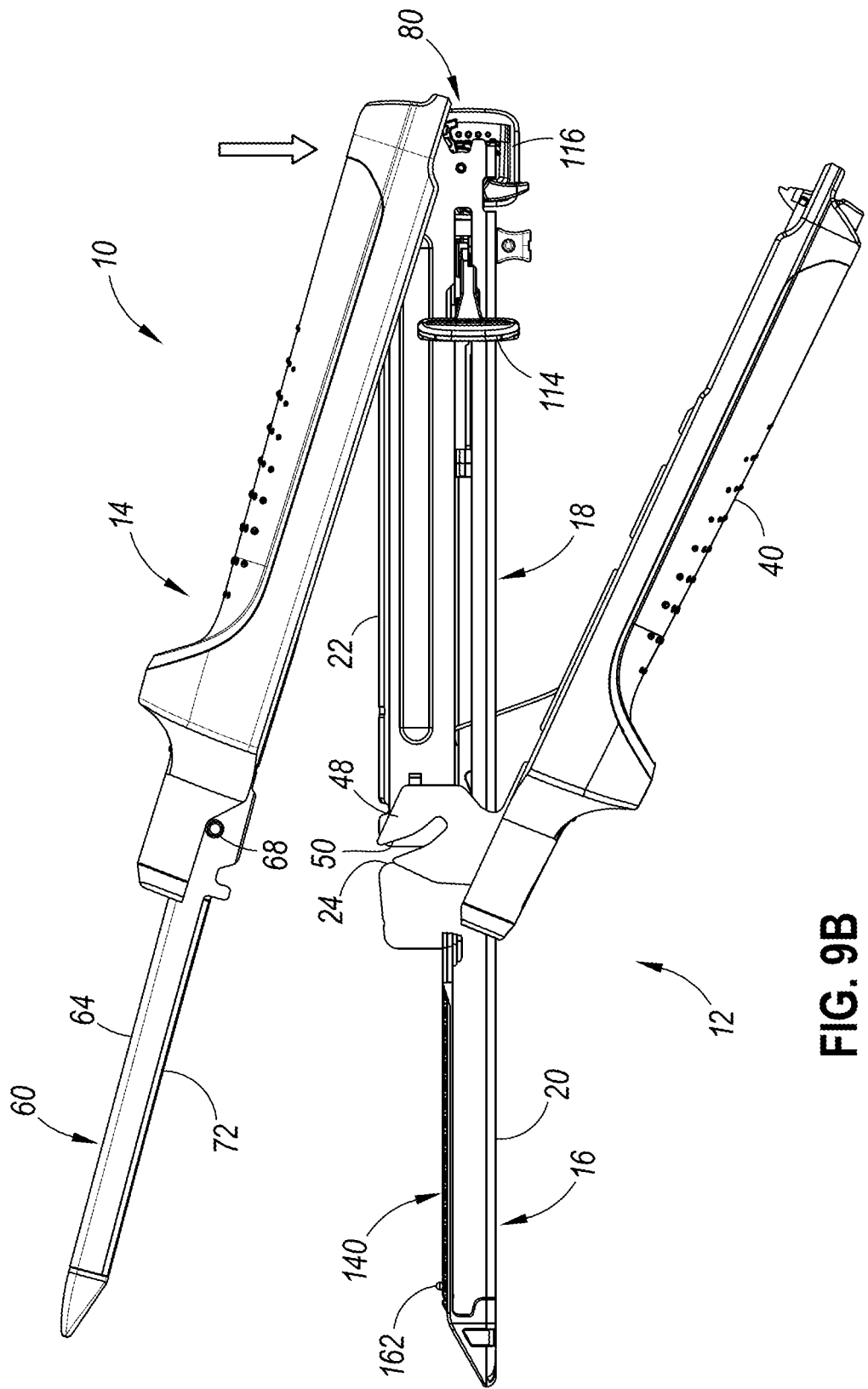
FIG. 9B depicts a side elevational view of the linear surgical stapler of FIG. 1, showing proximal ends of the stapler halves coupled together while the clamp lever is in the open position to provide the stapler in a "hang-open" state.
Figure 9C:
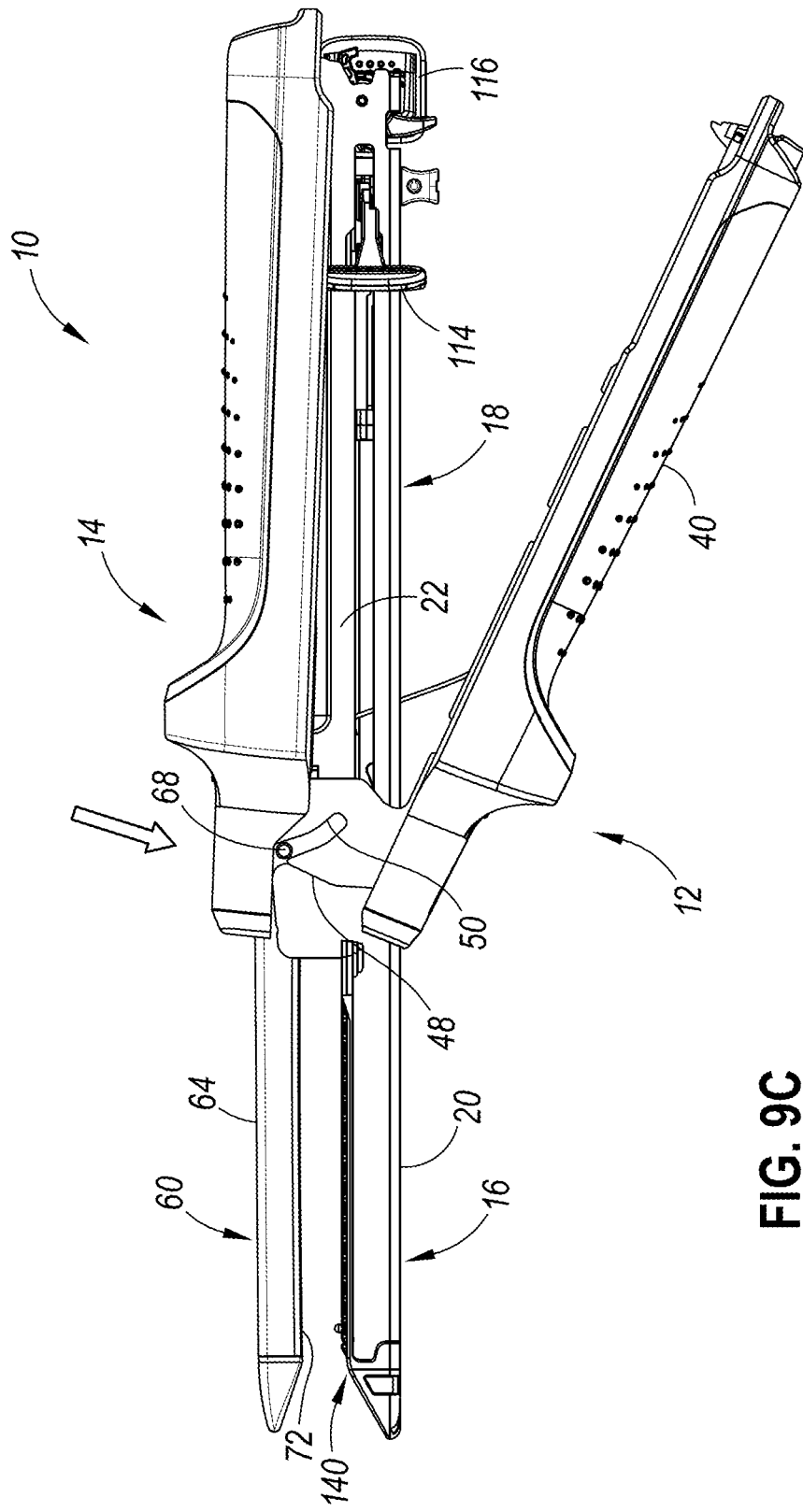
FIG. 9C depicts a side elevational view of the linear surgical stapler of FIG. 1, showing distal portions of the stapler halves having been approximated so that a distal pin of the anvil half is received by clamp lever jaws of the cartridge half.
Figure 9D:
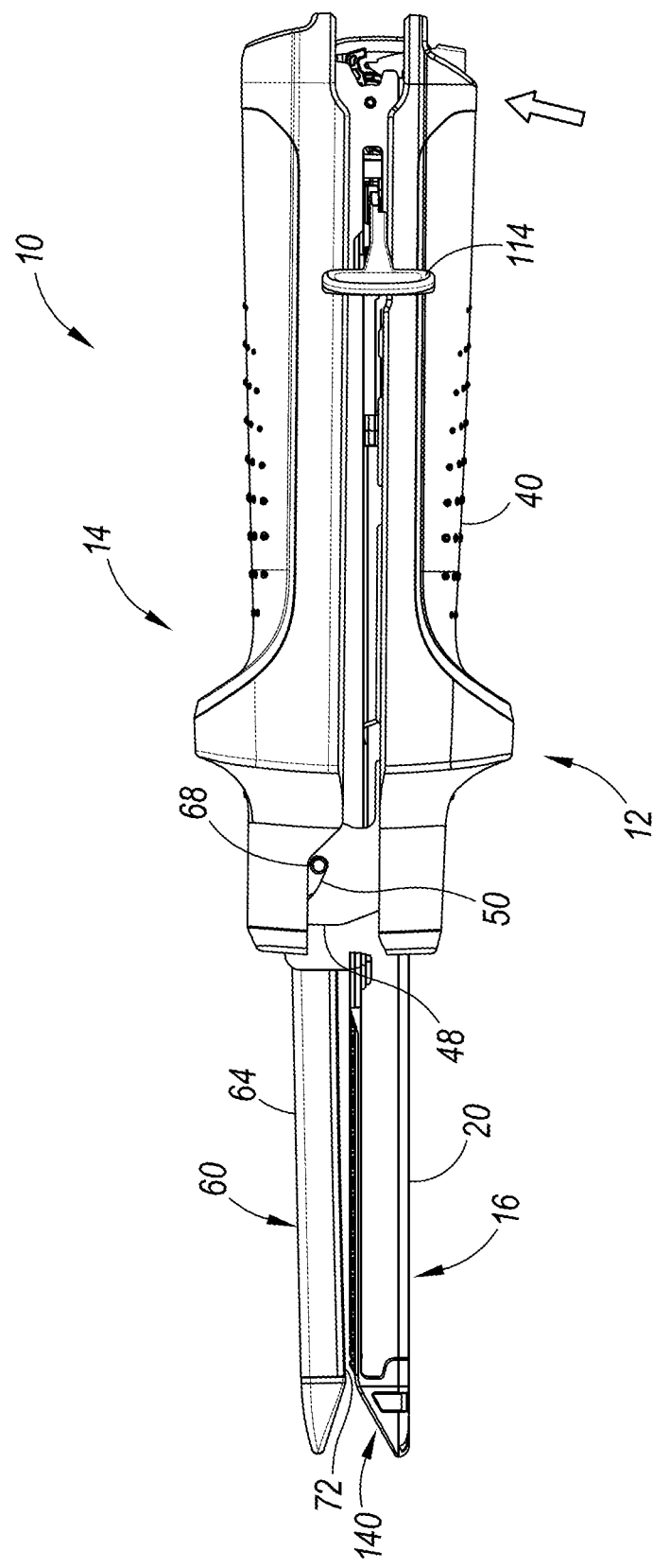
FIG. 9D depicts a side elevational view of the linear surgical stapler of FIG. 1, showing closure of the clamp lever to fully clamp the stapler halves together.

Clamp lever (40) is operable to pivot relative to cartridge channel (16) between an open position in which proximal end (46) of lever arm (44) is spaced from cartridge channel frame portion (18) as shown in FIGS. 9A-9C described below, and a closed position in which proximal end (46) confronts cartridge channel frame portion (18) as shown in FIG. 9D described below. Actuation of clamp lever (40) from the open position to the closed position operates to capture the opposed lateral ends of latch pin (68) within clamp lever jaw slots (50), and thereby clamp anvil half (14) against cartridge half (12), as shown and described below in connection with FIGS. 9C-9D. In that regard, the curvature of each jaw slot (50) defines respective upper and lower camming surfaces configured to engage and draw the respective lateral end of latch pin (68) toward cartridge channel (16) as clamp lever (40) is pivotably closed. A resilient member shown in the form of a leaf spring (52) biases lever arm (44) toward the open position. Accordingly, leaf spring (52) promotes disengagement of clamp lever jaws (48) from anvil half latch pin (68) upon initial advancement of clamp lever (40) from the closed position toward the open position.

As best shown in FIG. 2, clamp lever (40) further includes a latch member (54) arranged at proximal end (46) of lever arm (44). Clamp lever latch member (54) is configured to resiliently and releasably engage a proximal end of cartridge channel frame portion (18) and thereby releasably retain clamp lever (40) in the closed position, for instance while stapler (10) is being fired. Clamp lever latch member (54) may be further configured in accordance with the teachings of U.S. Pat. No. 11,278,285, entitled "Clamping Assembly for Linear Surgical Stapler," issued Mar. 22, 2022, the disclosure of which is incorporated by reference herein.

Anvil half (14) of linear surgical stapler (10) includes a second elongate member in the form of an elongate anvil channel (60) having a proximal frame portion (62) and a distal jaw portion (64). Proximal frame portion (62) includes a laterally opposed pair of upright side flanges (66) that are configured to be received between cartridge channel side flanges (22) when anvil half (14) is coupled with cartridge half (12). A distal latch projection in the form of latch pin (68) extends laterally through the distal ends of anvil channel side flanges (66), and a proximal pivot projection in the form of a proximal pin (70) extends laterally through the proximal ends of anvil channel side flanges (66). Anvil half pins (68, 70) are configured to facilitate coupling of anvil half (14) with cartridge half (12), as described below.

Figure 3:
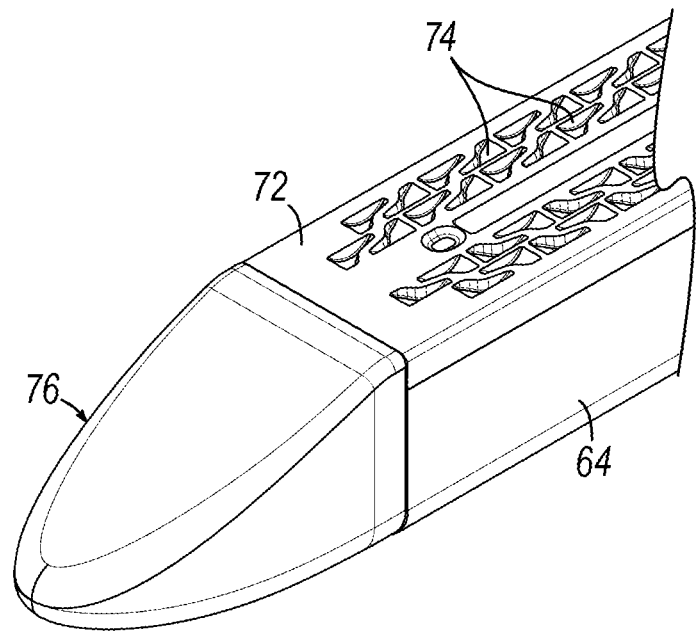
FIG. 3 depicts a perspective view of a distal end portion of the anvil half of the linear surgical stapler of FIG. 1.

As shown in FIGS. 2 and 3, distal jaw portion (64) of anvil half (14) supports an anvil plate (72) that defines a second stapling surface in the form of an anvil surface having a plurality of staple forming pockets (74) configured to deform legs of staples ejected by staple cartridge (140) when stapler (10) is fired. Staple forming pockets (74) of the present example may be formed via a coining process and are configured to form each staple of staple cartridge (140) with a three-dimensional shape in which the legs of each formed staple are laterally offset from one another so as to provide the formed staple with a non-planar shape, for example as disclosed in U.S. Pat. No. 11,229,433, entitled "Linear Surgical Stapler," issued Jan. 25, 2022, the disclosure of which is incorporated by reference herein. Anvil channel (60), anvil plate (72), and staple forming pockets (74) may be formed in one or more of the manners disclosed in U.S. Pat. Nos. 11,229,433; 11,045,193, entitled "Anvil Assembly for Linear Surgical Stapler," issued Jun. 29, 2021; and/or U.S. Pub. No. 2022/0142641, entitled "System and Method for Forming Pockets in Anvil of Surgical Stapler," published May 12, 2022, issued as U.S. Pat. No. 12,016,555 on Jun. 25, 2024, the disclosures of which are incorporated by reference herein. For instance, distal jaw portion (64) of anvil half (14) may be pre-formed with a curvature along its length that accommodates deflection of distal jaw portion (64) and anvil plate (72) when stapler halves (12, 14) are clamped together by clamp lever (40). Distal jaw portion (64) of anvil half (14) additionally supports an anvil insert (76). In some versions, the anvil insert (76) can be removable from the distal jaw portion (76) and replaced with a different anvil insert (76). In some versions, anvil insert (76) may be selectively extendable relative to distal jaw portion (64) in accordance with the teachings of U.S. Pat. No. 11,033,266, entitled "Decoupling Mechanism for Linear Surgical Stapler," issued Jun. 15, 2021, the disclosure of which is incorporated by reference herein.

As shown in FIG. 2, linear surgical stapler (10) further includes a pair of shrouds (56, 78) that cover select portions of stapler (10) and promote effective grip and manipulation of stapler (10) by an operator during use. In the present example, a clamp lever shroud (56) is affixed to and covers an outwardly facing side of clamp lever (40) such that clamp lever shroud (56) is configured to pivot with clamp lever (40) relative to cartridge channel (16). Additionally, an anvil shroud (78) is affixed to and covers an outwardly facing side of anvil channel (60). In some versions, anvil shroud (78) may be coupled with anvil channel (60) via interaction between pins (68, 70) and one or more tabs, ribs, or other structures that are disposed within an interior of anvil shroud (78) and include an opening, slot, keyhole, or other feature configured to receive a respective one of pins (68, 70). By way of example only, shrouds (56, 78) may be affixed using one or more of the teachings of U.S. Pat. No. 11,278,285, incorporated by reference above. In other versions, shrouds (56, 78) may be coupled with clamp lever (40) and anvil channel (60) in a variety of other suitable manners readily apparent to those of ordinary skill in the art in view of the teachings herein.

As shown best in FIGS. 2 and 5-7, a proximal end of cartridge half (12) includes a retaining assembly (80) configured to releasably retain portions of anvil half (14) and firing assembly (110). Retaining assembly (80) of the present example includes a first movable retaining member in the form of an anvil latch member (82) and a second movable retaining member in the form of a detent member (84). Anvil latch member (82) and detent member (84) are rotatably coupled with a proximal end of cartridge channel (16) via a laterally extending pin (85) arranged proximally of firing slots (32), and members (82, 84) are resiliently biased in opposite rotational directions by a resilient member in the form of a torsion spring (86) positioned between members (82, 84).

Anvil latch member (82) includes a central body (88), a latch finger (90) extending upwardly from central body (88), and a release button (92) extending downwardly from central body (88) though a base wall of proximal frame portion (18) of cartridge channel (16). An upper end of latch finger (90) tapers distally and is configured to releasably capture proximal anvil pin (70) of anvil half (14) with an angled latching surface (94) that overlies proximal anvil pin (70) once captured. Anvil latch member (82) further includes a pin ejection feature in the form of an angled projection (96) extending distally from a base portion of latch finger (90) and which defines an ejection cam ramp (98) that faces proximally toward latch finger (90).

Detent member (84) of proximal retaining assembly (80) includes a generally cylindrical central body (100), a distal finger (102) extending distally from central body (100), and a proximal hook (104) extending proximally from central body (100). Distal finger (102) is configured to releasably engage a proximal end of firing assembly (110) and thereby retain firing assembly (110) in a proximal home position. Proximal hook (104) is configured to overlie and capture an upper tip of clamp lever latch member (54) when clamp lever (40) is fully closed and firing assembly (110) is translated distally from its proximal home position, thereby preventing clamp lever (40) from opening during a firing stroke, for example as described in greater detail in U.S. Pat. No. 11,278,285, incorporated by reference above.

In use, with stapler halves (12, 14) coupled together at their proximal ends such that proximal anvil pin (70) is retained by anvil latch member (82), and with clamp lever (40) in the open position, distal actuation of lower release button (92) causes anvil latch member (82) to rotate about pin (85) such that ejection cam ramp (98) advances proximally to drive proximal anvil pin (70) upwardly out of proximal tapered notches (26) of cartridge channel (16). Cartridge half (12) of the present version further includes a stationary finger grip projection (106) that extends downwardly from a base wall of proximal frame portion (18) of cartridge channel (16) at a location distal to lower release button (92) and is configured to facilitate actuation of release button (92). In particular, a user may apply his or her thumb to a proximal side of release button (92) and one or more fingers to a distal side of finger grip projection (106), and then squeeze release button (92) distally toward stationary finger grip projection (106) to rotate latch finger (90) out of engagement with proximal anvil pin (70) and eject pin (70) upwardly from cartridge channel (16) with ejection cam ramp (98).

Retaining assembly (80) and related components of cartridge half (12) may be further configured and operable in accordance with one or more teachings of U.S. Pat. No. 10,898,187, entitled "Firing System for Linear Surgical Stapler," issued Jan. 26, 2021, the disclosure of which is incorporated by reference herein; and/or U.S. Pat. No. 11,033,266, incorporated by reference above.

Figure 8:
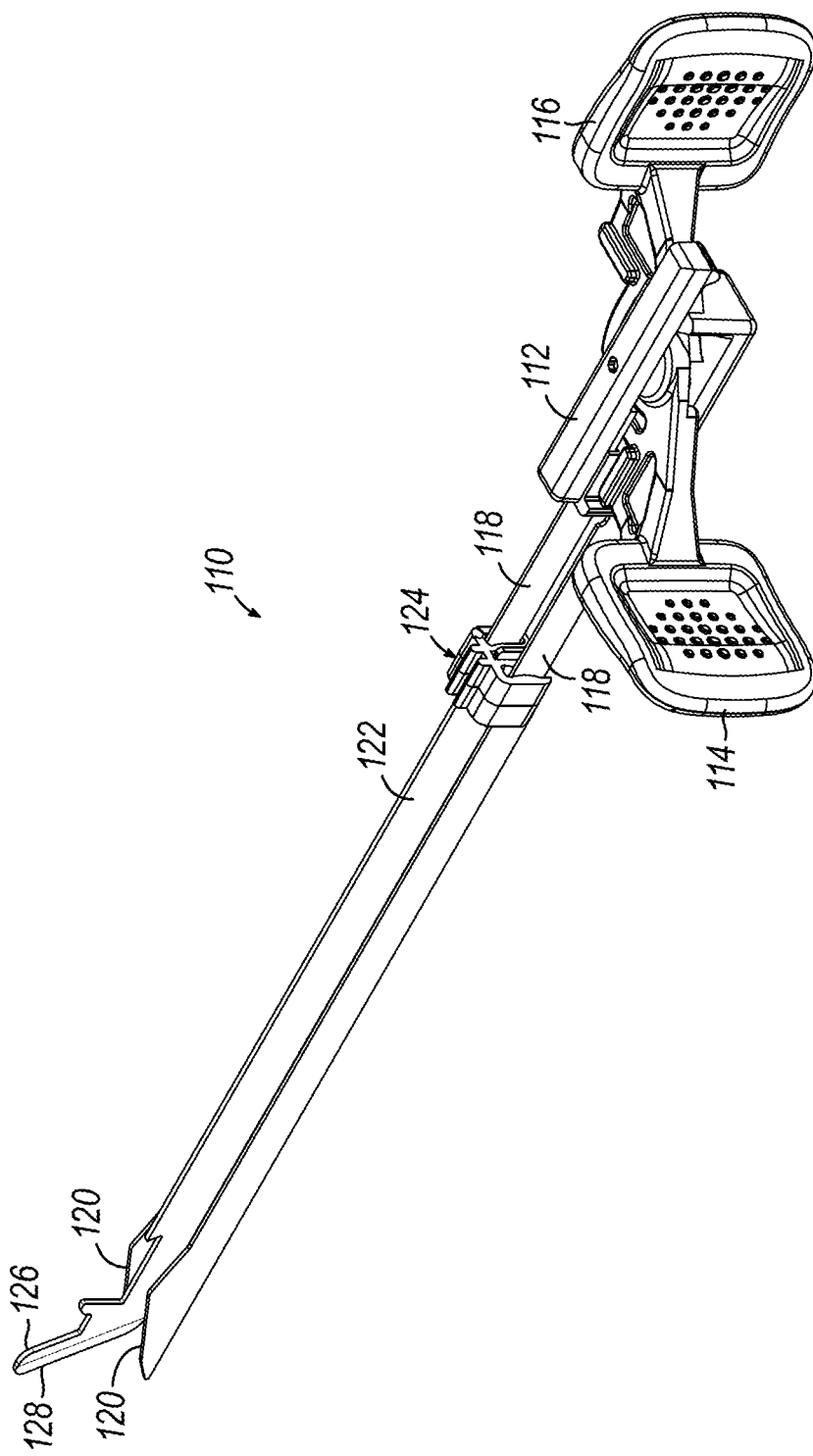
FIG. 8 depicts a perspective view of the firing assembly of FIG. 5.

As shown in FIG. 8, firing assembly (110) of cartridge half (12) includes a slide block (112), a pair of actuators (114, 116) (or "firing knobs") pivotably coupled to slide block (112), and a set of elongate beams (118, 122) extending distally from slide block (112). A pair of side beams (118) are coupled at their proximal ends to a distal end of slide block (112) and terminate distally in a pair of cam ramps (120). Cam ramps (120) are configured to engage the undersides of staple drivers (172) housed within staple cartridge (140) and actuate staple drivers (172) upwardly to thereby drive (or "fire") staples from cartridge (130) into tissue clamped between staple cartridge (140) and anvil plate (72). A center beam (122) is coupled with side beams (118) via a bridge member (124) (or "knife block") spaced distally from slide block (112). Center beam (122) terminates distally in a distally angled knife member (126) having a distal cutting edge (128) configured to cut tissue clamped between the distal portions of stapler halves (12, 14).

Each actuator (114, 116) of firing assembly (110) is configured and rotatable relative to slide block (112) between a deployed position and a retracted position such that only one actuator (114, 116) may be deployed at a time, for example as disclosed in U.S. Pat. No. 10,898,187, incorporated by reference above. In the deployed position, an actuator (114, 116) may be driven distally by an operator to actuate firing assembly (110) distally through stapler (10) and thereby simultaneously cut and staple tissue clamped between stapler halves (12, 14).

B. Illustrative Use of Linear Surgical Stapler

Figure 5:
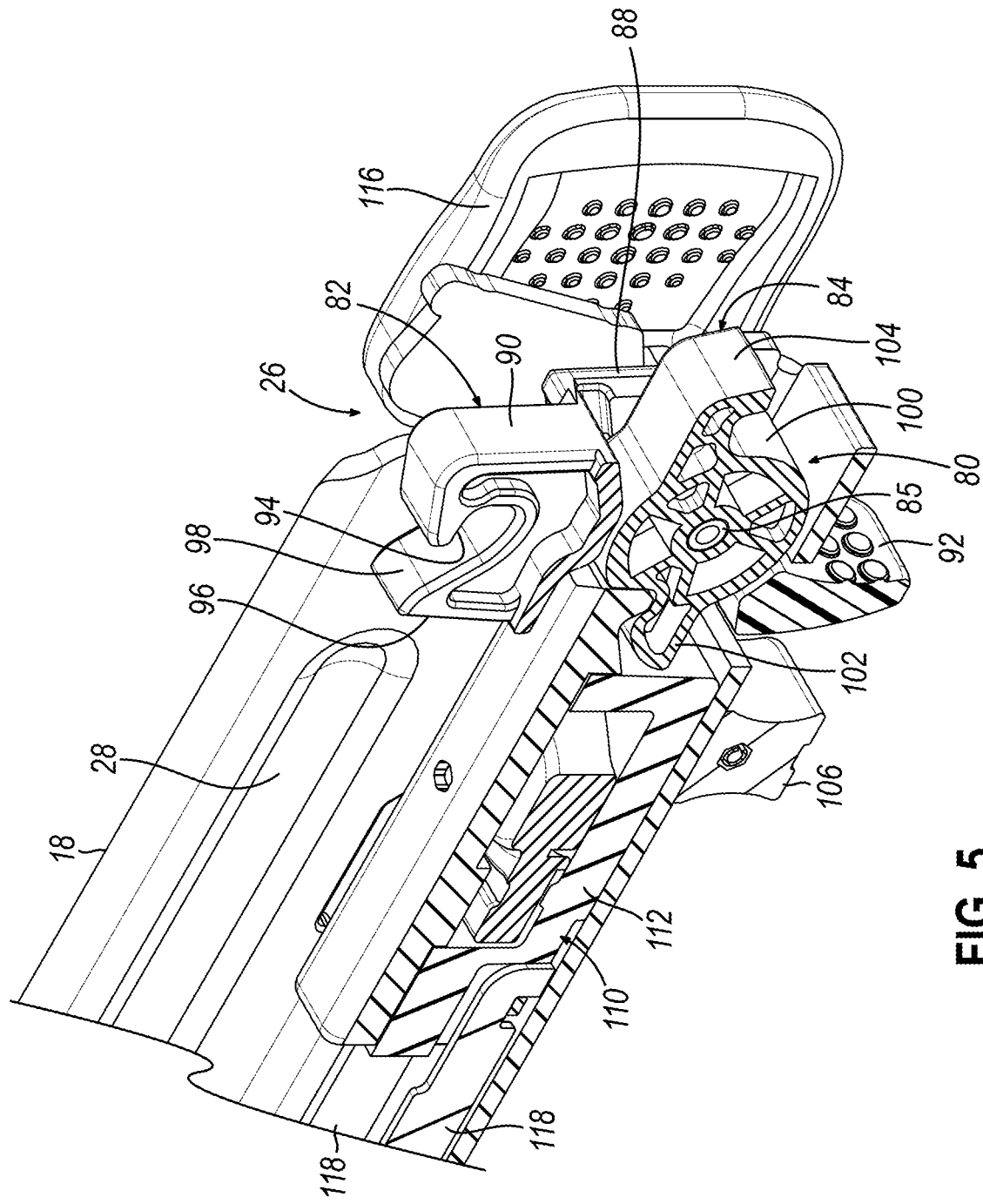
FIG. 5 depicts a cross-sectional perspective view of a proximal portion of the cartridge half of the linear surgical stapler of FIG. 1 with the clamp lever in an open position to reveal details of a firing assembly and a retaining assembly of the cartridge half.
Figure 6:
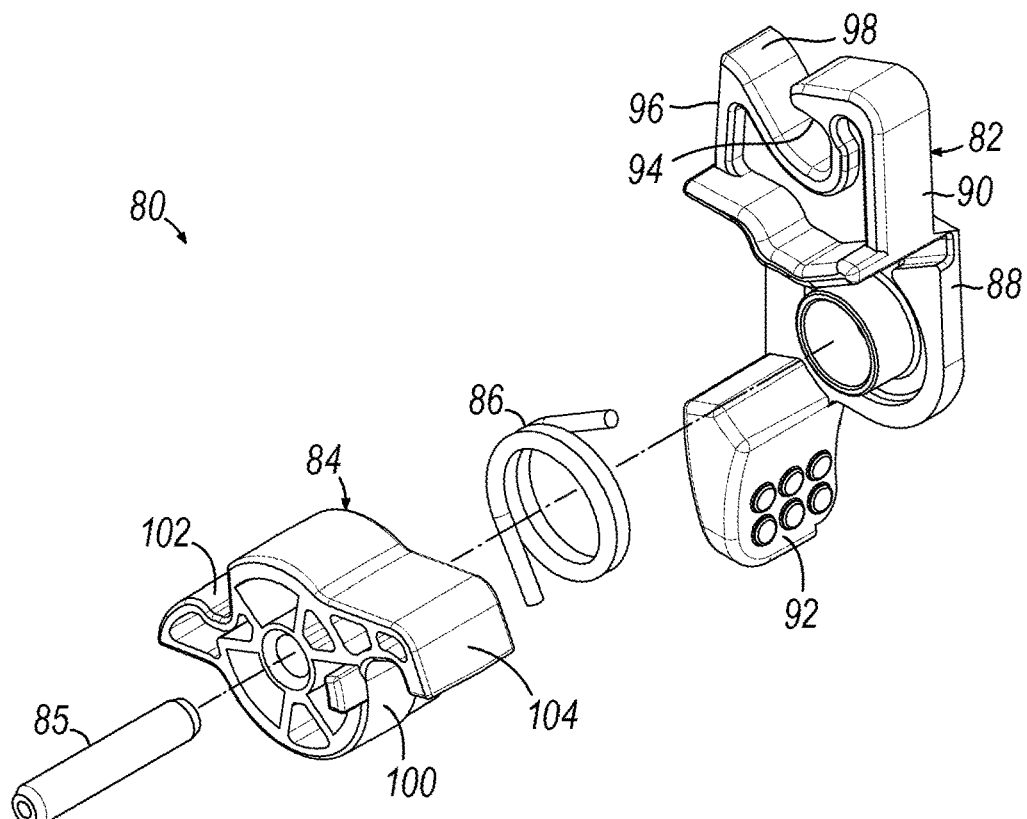
FIG. 6 depicts an exploded perspective view of the retaining assembly of FIG. 5.
Figure 7:
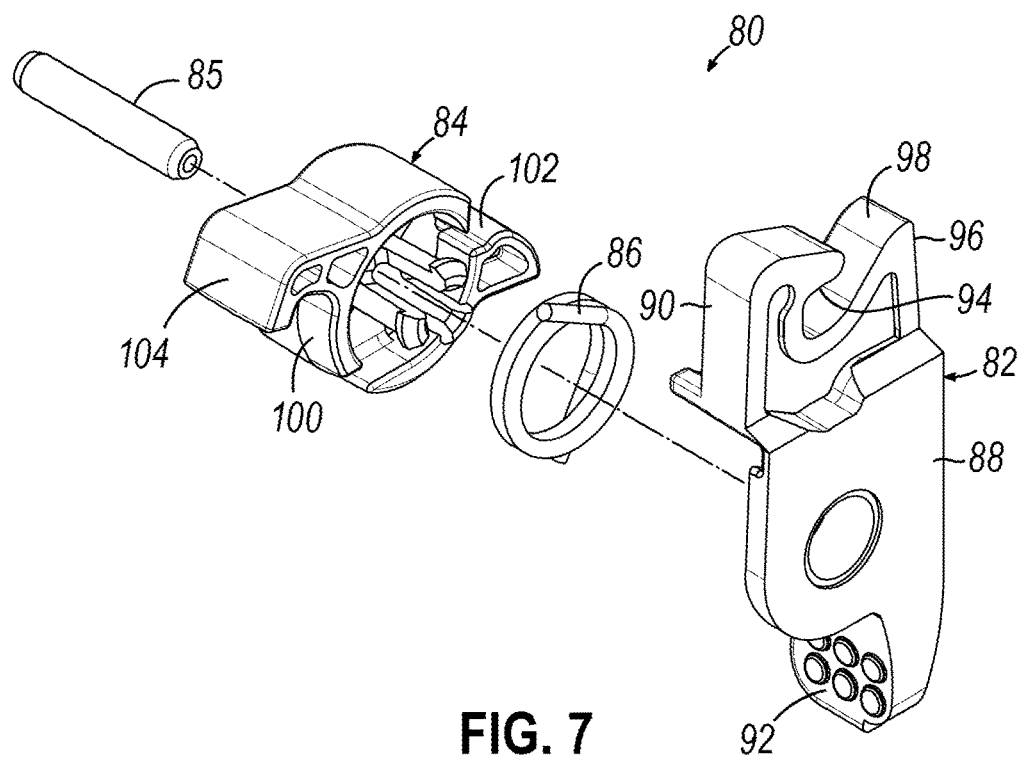
FIG. 7 depicts another exploded perspective view of the retaining assembly of FIG. 5.

FIGS. 9A-9E show illustrative coupling of stapler halves (12, 14) and subsequent firing of assembled stapler (10) during a surgical procedure. As shown in FIG. 9A, clamp lever (40) of cartridge half (12) is provided in the open position so that jaw slots (50) align with vertical slots (24) of cartridge channel side flanges (22). Additionally, firing assembly (110) is maintained in its proximal home position by detent member (84) of retaining assembly (80), as shown in FIG. 5 and described above. At this stage, a section of tissue (not shown) to be stapled and cut may be positioned over the top of staple cartridge (140) disposed in distal jaw portion (20) of cartridge half (12). Alternatively, the tissue may be positioned over staple cartridge (140) following coupling of the proximal ends of stapler halves (12, 14), described below.

As shown in FIGS. 9A-9B, the proximal ends of stapler halves (12, 14) are aligned with one another, and proximal anvil pin (70) is directed downwardly into proximal tapered notches (26) of cartridge channel (16) to engage latch finger (90) of anvil latch member (82). This engagement forces anvil latch member (82) to resiliently rotate clockwise, thus enabling latch finger (90) to capture anvil pin (70) and thereby releasably couple together the proximal ends of stapler halves (12, 14), as seen in FIG. 9B. With clamp lever (40) still in the open position as shown in FIG. 9B, stapler (10) is provided in a "hang-open" state such that stapler (10) may be held single-handedly by anvil half (14) while cartridge half (12) remains coupled to anvil half (14). As shown in FIG. 9C, and with clamp lever (40) remaining in the open position, anvil half (14) is rotated toward anvil half (14) about proximal anvil pin (70) so that distal latch pin (68) of anvil half (14) is received into vertical slots (24) of cartridge channel side flanges (22) and jaw slots (50) of clamp lever (40). Distal jaw portions (20, 64) of stapler halves (12, 14) are now in a partially approximated state such that tissue received therebetween may be finally adjusted before clamping.

As shown in FIG. 9D, clamp lever (40) is closed to draw anvil latch pin (68) against the closed proximal ends of jaw slots (50) and thereby fully clamp anvil half (14) against cartridge half (12), with tissue (not shown) clamped between the stapling surfaces defined by staple cartridge (140) and anvil plate (72). A slight transverse gap is defined between staple cartridge (140) and anvil plate (72) by a tissue gap post (162) of staple cartridge (140), thus accommodating the tissue therebetween with a predetermined degree of tissue compression. As shown in FIGS. 9A and 9B, tissue gap post (162) is disposed at a distal end of staple cartridge (140) and is configured to contact a distal end of anvil plate (72) when stapler (10) is in the fully clamped state shown in FIG. 9D. In response to clamp lever (40) reaching the fully closed position, clamp lever latch member (54) may rotate to capture a proximal end of a base wall of cartridge channel (16) and thereby assume a latched state in which clamp lever latch member (54) maintains clamp lever (40) in the closed position.

Figure 9E:
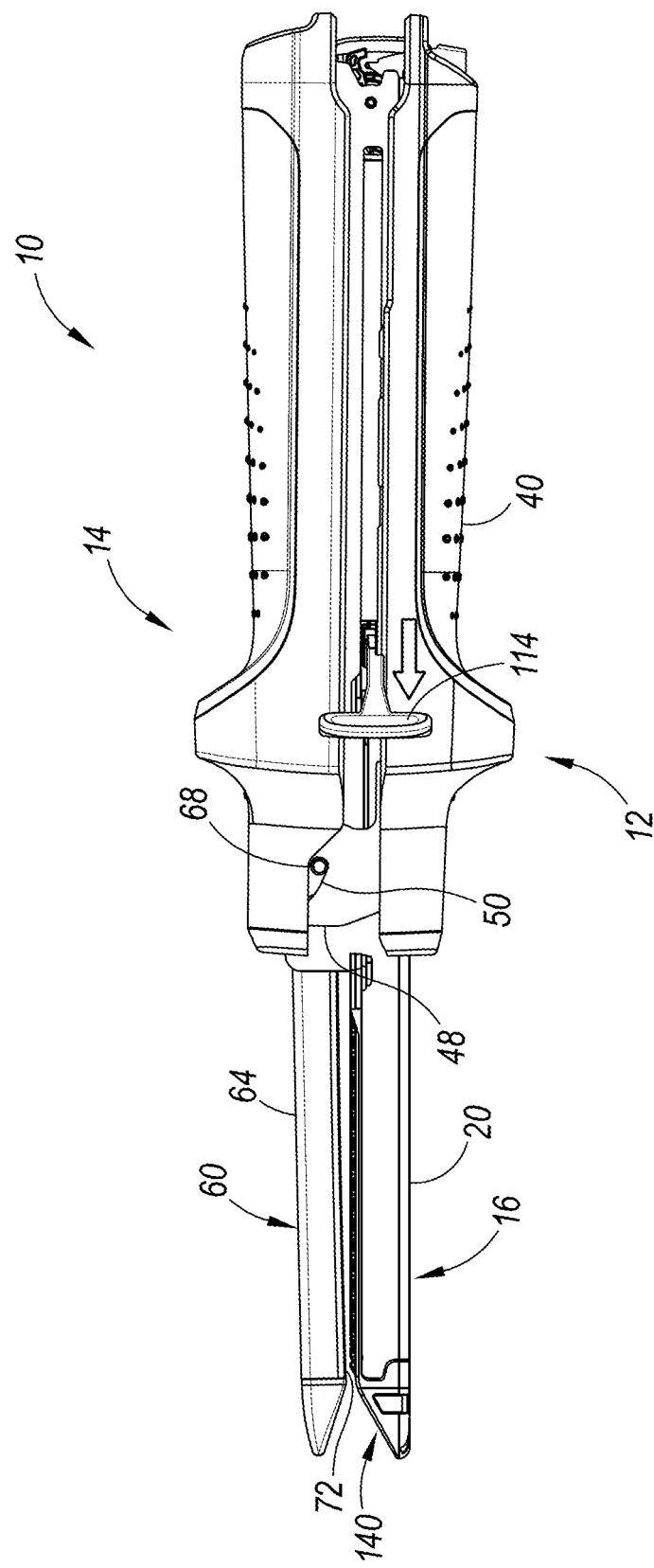
FIG. 9E depicts a side elevational view of the linear surgical stapler of FIG. 1, showing distal actuation of the firing assembly while the stapler halves are in the fully clamped state.

As shown in FIG. 9E, upon reaching the fully clamped state, stapler (10) may be fired by driving a deployed actuator (114, 116) of firing assembly (110) distally along proximal frame portion (18) of cartridge half (12). This action causes elongate beams (118, 122) of firing assembly (110) to translate distally through corresponding channels formed in staple cartridge (140) and thereby fire staples into the clamped tissue via cam ramps (120) and staple drivers (172), and simultaneously cut the clamped tissue with knife member (126). Following completion of the firing stroke, firing assembly (110) is returned to its proximal home position via the actuator (114, 116). Clamp lever latch member (54) may then be depressed to release the proximal end of clamp lever (40) from cartridge channel (16), thus permitting clamp lever (40) to be re-opened. Then, release button (92) of retaining assembly (80) may be depressed to release anvil half (14) from cartridge half (12) so that stapler halves (12, 14) may be separated from one another, thereby releasing the newly stapled and severed tissue. Stapler (10) may be further configured and operable in accordance with the teachings of U.S. patent application Ser. No. 18/316,635, entitled "Linear Surgical Stapler," filed on May 12, 2023, published as U.S. Pat. Pub. No. 2023/0397911 on Dec. 14, 2023, the disclosure of which is incorporated by reference herein, in its entity. Additionally, it will be understood that in some versions, stapler (10) may include additional features to promote decoupling of stapler halves (12, 14), for example as disclosed in U.S. Pat. No. 11,033,266, incorporated by reference above.

II. Illustrative Linear Surgical Stapler with Alternative Intelligent Anvil Inserts Generally speaking, when a linear stapler is utilized in a surgical procedure, such as a gastrointestinal anastomosis, it can be helpful for a user to be presented information about the tissue and/or the linear stapler before and during the procedure, such as, for example, whether the tissue is properly clamped, whether the stapler cartridge is present, the type of stapler cartridge being used, the position of the knife member during cutting, and the amount of times that the knife member has been fired. However, this sort of functionality is typically incorporated into the linear stapler during manufacture and therefore oftentimes considered to be cost prohibitive. Furthermore, incorporating a desired sensing capability into the linear stapler typically requires that specific components be hardwired into the linear stapler which may limit any future customization of the sensing capabilities of the linear stapler. It may therefore be desirable to provide such functionality in an intelligent anvil insert that can be selectively installed on a linear stapler to upgrade the linear stapler to include the sensing capabilities offered by the intelligent anvil insert. It may also be desirable to provide different intelligent anvil inserts that have different sensing capabilities to allow a user to customize the sensing capabilities of a linear stapler depending on the particular intelligent anvil insert that is selected for installation on the linear stapler. The following description relates to various examples of intelligent anvils that are capable of being incorporated into a linear stapler. While these examples are illustrated and described separately from each other, it should be appreciated that the features described in any of the following examples may be combined with the features described in other examples described below. Thus, the below-described features may be combined in various permutations as will be apparent to those skilled in the art in view of the teachings herein.

A. Intelligent Anvil Insert Having Sensor for Detecting Improper Clamping

With reference again to stapler (10) illustrated in FIGS. 1-9E, generally speaking, when tissue is provided between cartridge half (12) and anvil half (14), the clamp lever (40) can be closed to encourage cartridge half (12) and anvil half (14) into a fully clamped position around the tissue. The relative spacing between the tissue gap post (162) and the anvil plate (72) is intended to provide a visual indication to the surgeon of whether the tissue is actually fully clamped properly. This spacing, however, can be easily overlooked, and in some instances, might be obstructed by the tissue. As a result, the surgeon might only rely on the closing of clamp lever (40) as confirmation that that tissue is properly clamped. If the tissue is improperly clamped after closing clamp lever (40) and the surgeon proceeds to fire the stapler, the resulting cut and/or staple insertion can be compromised. It may therefore be desirable to detect the improper clamping of the cartridge half (12) and anvil half (14) and to generate a notification to the surgeon to indicate when cartridge half (12) and anvil half (14) are not fully clamped together to prevent the surgeon from incorrectly firing the stapler (10). It should be understood that the features discussed below may be readily incorporated into surgical stapling instrument (10) discussed above. To this end, like numbers indicate like features described above in greater detail.

1. Intelligent Anvil Insert Having Deflection Sensor

FIGS. 10-15 show another illustrative linear surgical stapler (210) that is generally similar to linear surgical stapler (10) described above except as otherwise described below. Linear surgical stapler (210) includes a cartridge half (212) (or "reload half") and an anvil half (214) configured to releasably couple together to clamp tissue therebetween for simultaneous cutting and stapling of the clamped tissue.

Figure 10:
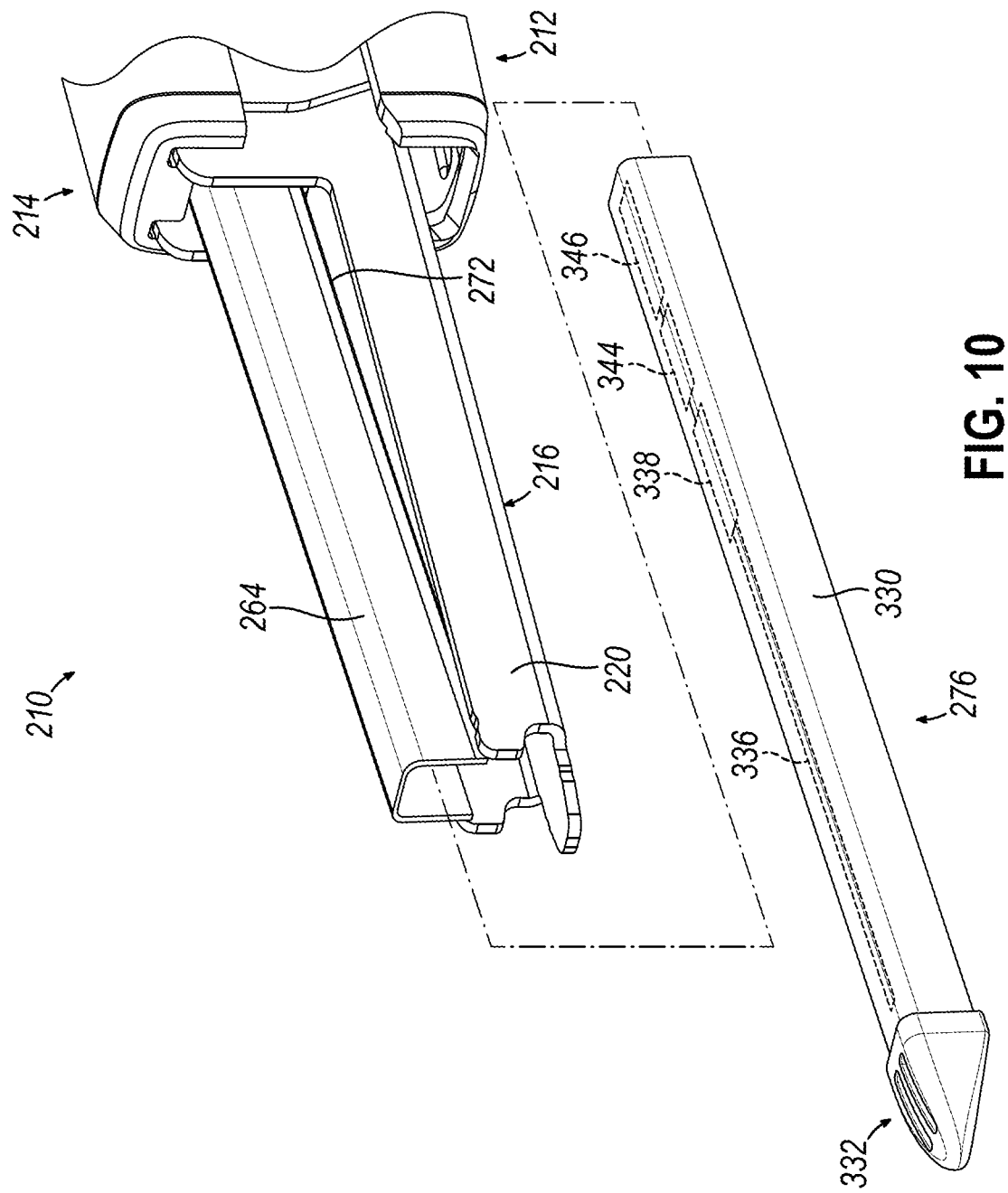
FIG. 10 depicts a perspective view of a distal end of another illustrative linear surgical stapler, showing an anvil insert associated with a distal jaw portion of a cartridge half.
Figure 11:
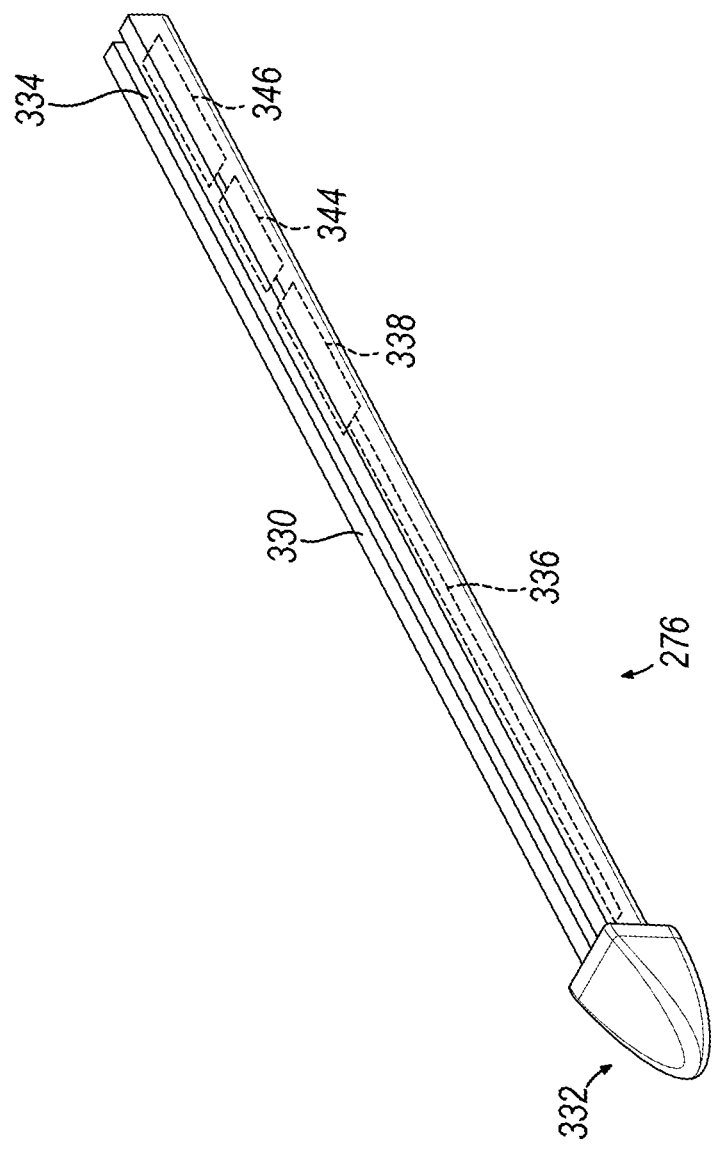
FIG. 11 depicts a perspective view of the anvil insert of FIG. 10.
Figure 12:
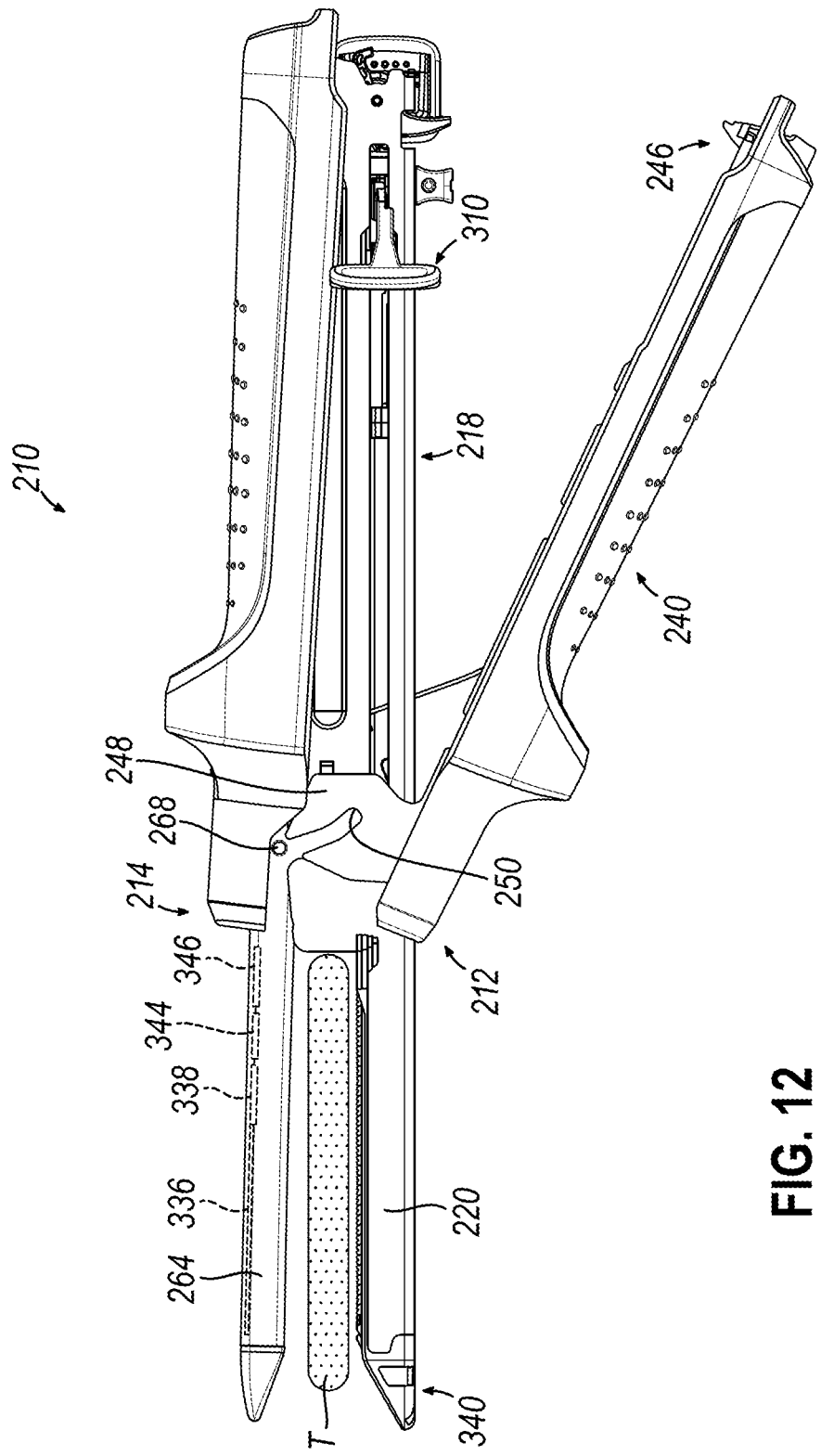
FIG. 12 depicts a side elevational view of the linear surgical stapler of FIG. 10, showing a cartridge half and an anvil half of the stapler having been approximated so that a distal pin of the anvil half is received by clamp lever jaws of the cartridge half.
Figure 13:
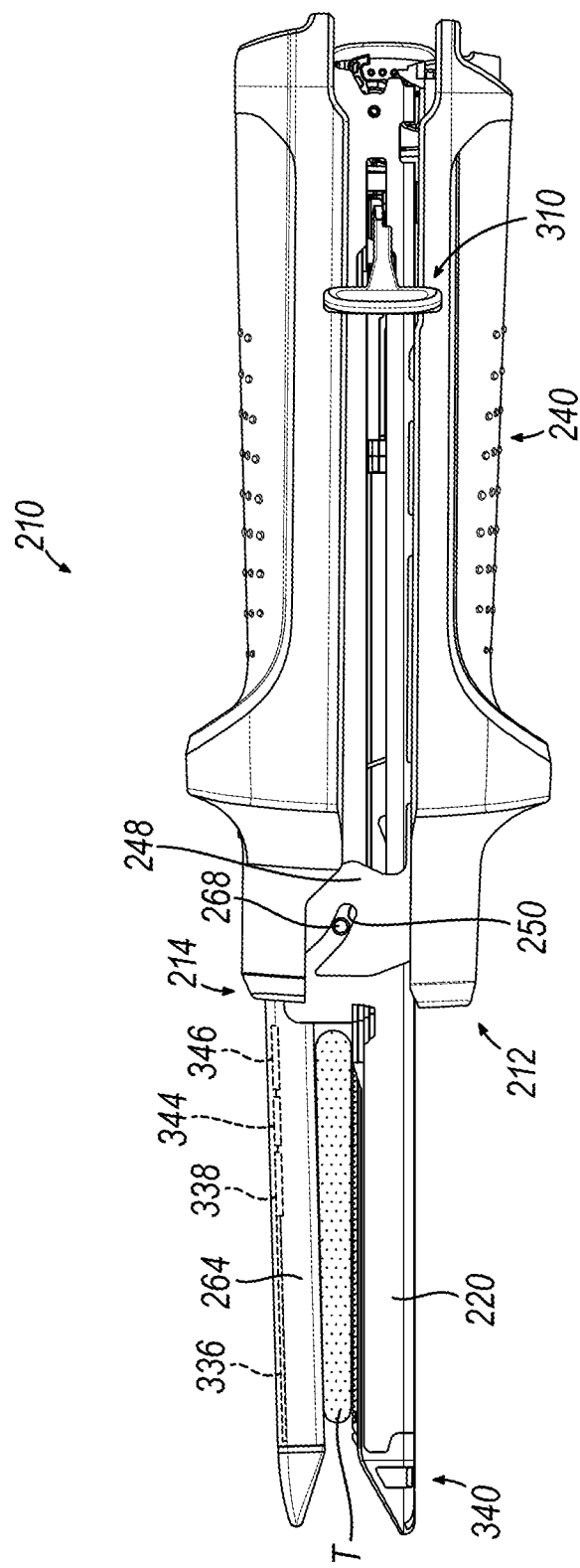
FIG. 13 depicts a side elevational view of the linear surgical stapler of FIG. 10, showing closure of the clamp lever to fully clamp the stapler halves together over tissue.
Figure 14:
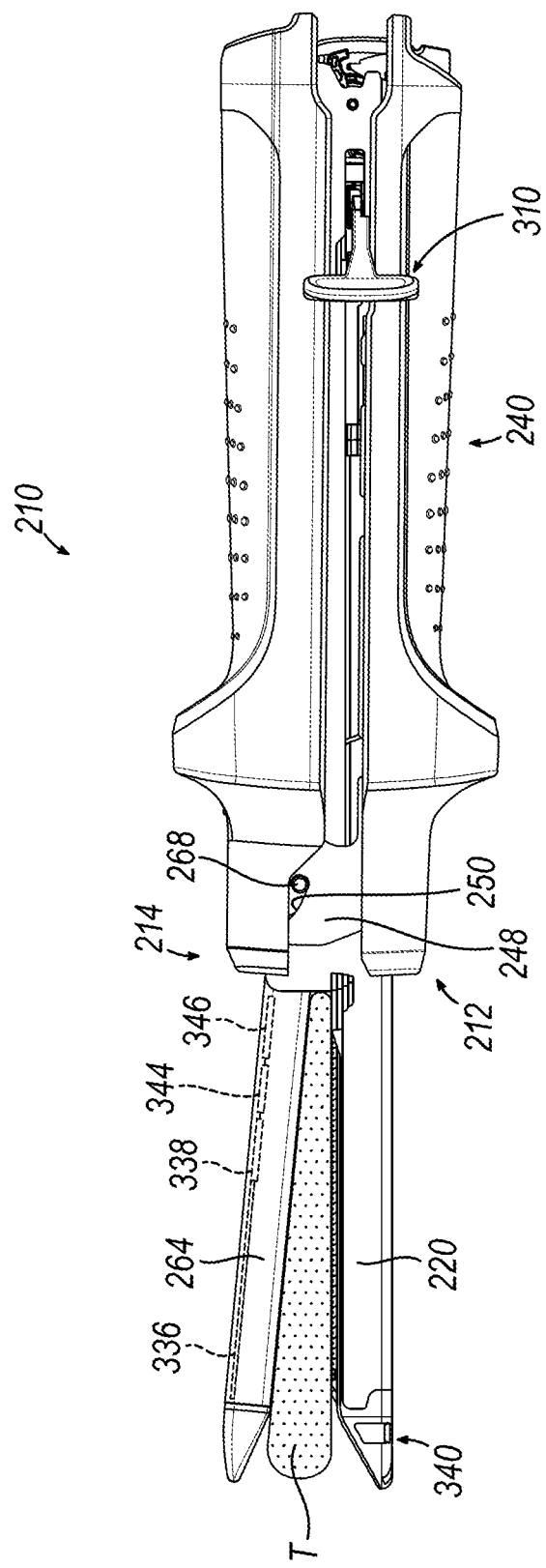
FIG. 14 depicts a side elevational view of the linear surgical stapler of FIG. 10, showing closure of the clamp lever to clamp the stapler halves together over tissue but with the stapler halves urged apart by the tissue.

As illustrated in FIGS. 10, cartridge half (212) includes an elongate cartridge channel (216) having a distal jaw portion (220). Distal jaw portion (220) of cartridge channel (16) is configured to releasably receive a staple cartridge (340) (FIGS. 12-14). Distal jaw portion (264) of anvil half (214) includes a pair of anvil plates (272) that cooperate to provide a second stapling surface in the form of an anvil surface having a plurality of staple forming pockets that are configured to deform legs of staples discharged from staple cartridge (340). Anvil plates (272) are spaced from each other to define a slot therebetween. Distal jaw portion (264) of anvil half (214) supports an anvil insert (276) that is insertable into the distal jaw portion (264). Anvil insert (276) includes an elongate main body (330) and a contoured tip (332) extending distally from elongate main body (330). Elongate main body (330) is configured to fit within distal jaw portion (264). Contoured tip (332) is configured to abut against distal jaw portion (264) and extend distally therefrom such that the contoured tip serves as a leading edge for the anvil half (214) during a surgical procedure. As illustrated in FIG. 11, anvil insert (276) defines a slot (334) that extends longitudinally along elongate main body (330) and is disposed between anvil plates (272). Slot (334) is configured to accommodate a tip of a knife member (e.g., 126 in FIG. 8), as will be described in further detail below. Distal jaw portion (264) and anvil insert (276) are configured for releasable coupling therebetween such that anvil insert (276) is able to be removed from anvil half (14) and replaced with a different anvil insert. Distal jaw portion (264) and anvil insert (276) are configured with a cooperative retention feature, such as a detent, that facilitates retention of anvil insert (276) in distal jaw portion (264) when anvil insert (276) is installed therein.

As illustrated in FIGS. 12-14, cartridge half (212) further includes a clamp member in the form of a clamp lever (240) pivotably coupled to cartridge channel (216). Clamp lever (240) is operable to pivot relative to cartridge channel (216) between an open position in which a proximal end (246) of clamp lever (240) is spaced from cartridge channel frame portion (218) as shown in FIG. 12, and a closed position in which proximal end (246) confronts cartridge channel frame portion (218) as shown in FIGS. 13 and 14. A pair of opposed jaws (248) (one shown) extend distally from the distal end of clamp lever (240). Each opposed jaw (248) includes a curved slot (250) having a closed proximal end and an open distal end configured to receive a latch pin (268) of anvil half (214). Latch pin (268) extends laterally through elongate anvil channel (e.g., 60). Actuation of clamp lever (240) from the open position to the closed position operates to capture the opposed lateral ends of latch pin (268) within curved slots (250), and thereby draw anvil half (214) and cartridge half (212) together. As illustrated in FIG. 12, when clamp lever (240) is in the opened position, distal jaw portions (220, 264) are spread apart to allow a tissue (T) from a patient to be provided therebetween. As illustrated in FIG. 13, when clamp lever (240) is subsequently moved to the closed position, distal jaw portions (220, 264) clamp together to clamp tissue (T) therebetween. Once tissue (T) is successfully clamped distal jaw portions (220, 264), a firing assembly (310) can be actuated to cut tissue (T) with a knife member (e.g., 126) and simultaneously drive staples through the tissue on either side of the cut line. During cutting of the tissue T, the knife member slides within slot (334) of anvil insert (276) such that anvil insert (276) serves as a cutting guide for the knife member.

Anvil insert (276) can be configured as an intelligent device that is configured to measure deflection that may be imparted to anvil half (214) when tissue (T) is clamped between cartridge half (212) and anvil half (214). The deflection measured by anvil insert (276) can be used to determine whether tissue (T) is improperly clamped between cartridge half (212) and anvil half (214), as will be described in further detail below. As illustrated in FIGS. 10 and 11, anvil insert (276) includes a strain gage (336) that is configured to detect the deflection of anvil insert (276). Strain gage (336) comprises a wire that is configured to detect deflection of anvil insert (276) based upon the elongation of the wire when anvil insert (276) is flexed. It is to be appreciated that strain gage (336) can be any of a variety of suitable alternative sensing arrangements that facilitates measurement of deflection, such as, for example, a load cell or Hall effect sensor, and can additionally or alternatively be mounted at any location on anvil insert (276).

Strain gage (336) is communicatively coupled to a microprocessor (338) and transmits deflection data to microprocessor (338), as will be described in more detail below. Microprocessor (338) may be embodied as any type of processor capable of performing the functions described herein. For example, microprocessor (338) may be embodied as a single or multi-core processor, a digital signal processor, a microprocessor, a general purpose central processing unit (CPU), a reduced instruction set computer (RISC) processor, a processor having a pipeline, a complex instruction set computer (CISC) processor, an application specific integrated circuit (ASIC), a programmable logic device (PLD), a field programmable gate array (FPGA), or other processor or processing/controlling circuit or controller.

Microprocessor (338) is communicatively coupled to a wireless communication module (344) that facilitates wireless communication with a console (not shown) via any of a variety of wireless communication protocols such as, for example, Wi-Fi, Cellular, or Wireless Personal Area Networks (WPAN) (e.g., IrDA, Bluetooth, Bluetooth Low Energy, Zigbee, wireless USB). The anvil insert (276) may additionally or alternatively be configured to support wired communication via a communication port (not shown), such as a USB port, for example. The console (not shown) may receive a message from wireless communication module (344) and facilitate generation of a notification to a user of linear surgical stapler (210). By way of example only, the console may include a data processor and a display that cooperate to generate the notification. Further, the console may be a component of a robotic electrosurgical system. Various suitable forms that a console for stapler (10) may take will be apparent to those skilled in the art in view of the teachings herein.

Strain gage (336), microprocessor (338), and wireless communication module (344) are powered by an onboard power source (346) which can comprise a disposable battery, a rechargeable battery, a supercapacitor or any of a variety of suitable alternative power storage arrangements. Strain gage (336), microprocessor (338), wireless communication module (344) and onboard power source (346) are embedded into anvil insert (276) such that strain gage (336), microprocessor (338), wireless communication module (344), and onboard power source (346) are concealed from plain sight.

The microprocessor (338) is configured to detect improper clamping of tissue (T) as a function of the deflection of anvil insert (276). When linear surgical stapler (210) is clamped onto tissue (T) by closing clamp lever (240), tissue (T) may be too thick and/or improperly positioned between distal jaw portions (220, 264) to allow them to properly clamp together, as illustrated in FIG. 14. Such improper clamping can cause excessive deflection of the anvil insert (276). The microprocessor (338) can therefore monitor the deflection of anvil insert (276) via strain gage (336) to determine whether the tissue (T) is improperly clamped and thus causing excessive deflection of anvil insert (276). If the microprocessor (338) determines that the anvil insert (276) is being excessively deflected by tissue (T), the microprocessor (338) can transmit a message to the console, via wireless communication module (344), that causes the console to generate a notification that warns the user that tissue (T) is improperly clamped to prevent them from firing the stapler. The user can then reposition the stapler on tissue (T) until proper clamping is achieved. Once tissue (T) is properly clamped, microprocessor (338) can stop transmitting the message to terminate the notification on the console thus indicating to the user that linear surgical stapler (210) is ready to fire. In one example, microprocessor (338) can transmit a different message to the console that causes the console to display a notification to the user indicating that linear surgical stapler (210) is ready to fire. The notification(s) presented by the console can be a visual notification, such as message displayed on a screen or a flashing light, an audible notification, such as a chime or a recorded spoken message, or a combination thereof.

In one example, microprocessor (338) can compare the deflection amount detected by strain gage (336) to a threshold value to determine whether tissue (T) is improperly clamped. The threshold value can be understood to represent the minimum amount of deflection that the anvil insert (276) can undergo before cutting and/or stapling would be adversely affected. If the detected deflection is below the threshold value, thus indicating that tissue (T) is properly clamped, microprocessor (338) refrains from transmitting a warning message to the console, or alternatively, transmits a permission message to the console to cause the console to notify the user that linear surgical stapler (210) is ready to fire. In instances where microprocessor (338) causes the console to notify the user that linear surgical stapler (210) is ready to fire, the microprocessor (338) may delay the transmission of the permission message for a predefined time period (i.e., 15 seconds) after initially detecting the deflection to ensure that tissue (T) is properly clamped. If the detected deflection is above the threshold value, thus indicating that tissue (T) is improperly clamped, microprocessor (338) transmits the warning message to the console and the console, in response, notifies the user to refrain from firing linear surgical stapler (210) before releasing tissue (T) and reclamping.

In one configuration, strain gage (336) and microprocessor (338) can be selectively activated in response to clamping of tissue (T) in an effort to conserve power consumption. For example, prior to clamping of tissue (T), such as when clamp lever (240) is opened, strain gage (336) and microprocessor (338) are deactivated (i.e., are in a sleep mode). Once tissue (T) is clamped between distal jaw portions (220, 264), strain gage (336) and microprocessor (338) can be activated to initialize sensing of the deflection of the anvil insert (276), as described above. The activation of strain gage (336) and microprocessor (338) can be a function of the position of the clamp lever 240. When clamp lever (240) is opened, strain gage (336) and microprocessor (338) can be deactivated. When clamp lever (240) is closed to clamp tissue (T), the microprocessor can recognize the closing of clamp lever (240) and can initialize sensing of the deflection of the anvil insert (276) with strain gage (336). In one example, microprocessor (338) can recognize the status of clamp lever (240) via a switch (not shown) that is associated with clamp lever (240) and indicates whether clamp lever (240) is opened or closed. Anvil insert (276) might additionally or alternatively include a manual switch, such as a pushbutton or a microswitch that allows a user to manually control the activation of strain gage (336) and microprocessor (338) through activation of the switch.

The anvil insert (276) is intended to be provided as a standalone device that can replace a conventional anvil insert (e.g., 76 in FIGS. 2 and 3) in order to add the sensing functionality described above to a stapler (e.g., 10). In some instances, anvil insert (276) can be provided as an aftermarket solution for adding the sensing functionality described above to an existing stapler (e.g., 10) that is already equipped with a conventional anvil insert, such as a stapler that has already been placed in service. In these instances, the conventional anvil insert (76) can be removed from the stapler (10) and replaced with anvil insert (276). In other instances, anvil insert (276) can be incorporated into linear surgical stapler (210) prior to delivery to a consumer such that linear surgical stapler (210) and anvil insert (276) can be sold together as a kit. In any event, anvil insert (276) provides a cost effective and simple solution for providing functionality described above to a stapler that doesn't otherwise have such functionality.

Figure 15:
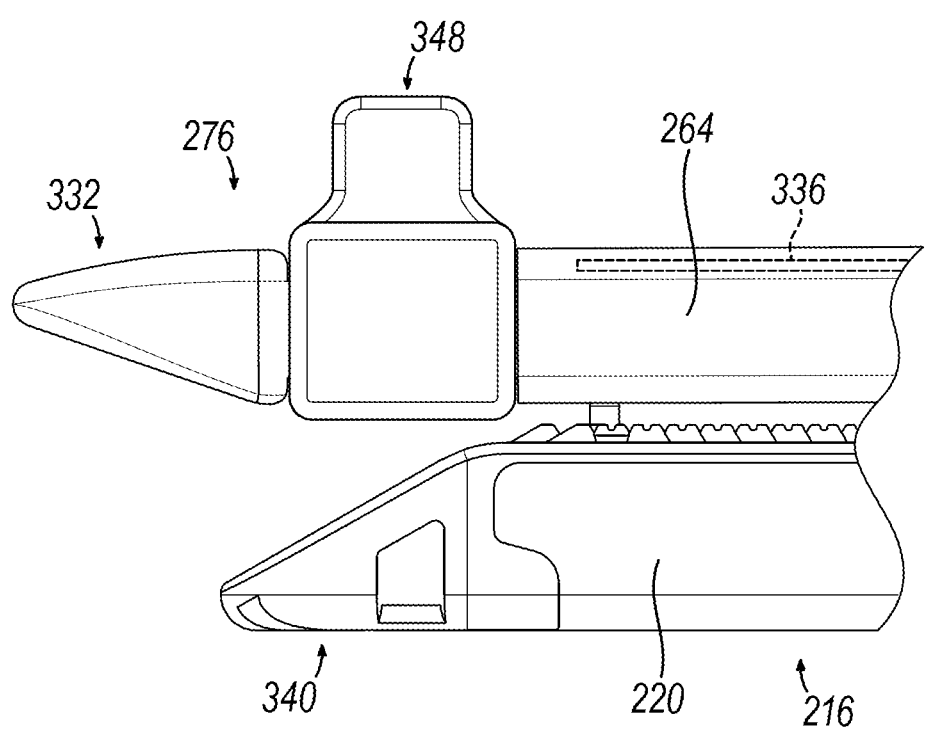
FIG. 15 depicts an enlarged side elevational view of distal jaw portions of the linear surgical stapler of FIG. 10.

FIG. 15 illustrates a configuration of linear surgical stapler (210) where anvil insert (276) is already incorporated into linear surgical stapler (210) when it is delivered to the user (i.e., as a kit). For purposes of this configuration, onboard power source (346) comprises a battery. Anvil insert (276) is shown to be partially installed in distal jaw portion (264) such that contoured tip (332) is spaced from distal jaw portion (264). A pull tab (348) is interposed between distal jaw portion (264) and contoured tip (332) and is configured to selectively interrupt connection of the battery to strain gage (336), microprocessor (338), and wireless communication module (344) to prevent powering thereof. When linear surgical stapler (210) is initially placed in service, pull tab (348) can be removed from anvil insert (276) to connect the battery to strain gage (336), microprocessor (338), and wireless communication module (344) to facilitate powering thereof. Anvil insert (276) is proximally biased with respect to distal jaw portion (264) by an internal spring (not shown) such that when pull tab (348) is removed, anvil insert (276) automatically slides proximally and into a fully installed position.

FIGS. 16 and 17 are cutaway views of another illustrative linear surgical stapler (410) that is generally similar to linear surgical stapler (210) described above except as otherwise described below. Linear surgical stapler (410) includes a distal jaw portion (464) and an anvil insert (476) slidably coupled with distal jaw portion (464). Anvil insert (476), however, includes an internal power circuit (550) that terminates at an interface (552). Internal power circuit (550) is provided in lieu of onboard power source (346) and is configured to selectively power strain gage (e.g., 336), microprocessor (e.g., 338), and wireless communication module (e.g., 344). A power port (554) can be provided within distal jaw portion (464) at a proximal end thereof. Power port (554) is powered internally by the stapler such as from a power source located onboard linear surgical stapler (410) or from a remote power source connected to linear surgical stapler (410) via a cable. As illustrated in FIG. 16, anvil insert (476) is shown partially installed in distal jaw portion (464) such that interface (552) is physically spaced from power port (554). When in this position, internal power circuit (550) is electrically disconnected from power port (554) to prevent powering of anvil insert (476) with power port (554). When anvil insert (476) is fully installed in distal jaw portion (464), as illustrated in FIG. 17, internal power circuit (550) becomes electrically connected to power port (554) which facilitates powering of anvil insert (476) with linear surgical stapler (410).

Figure 18:
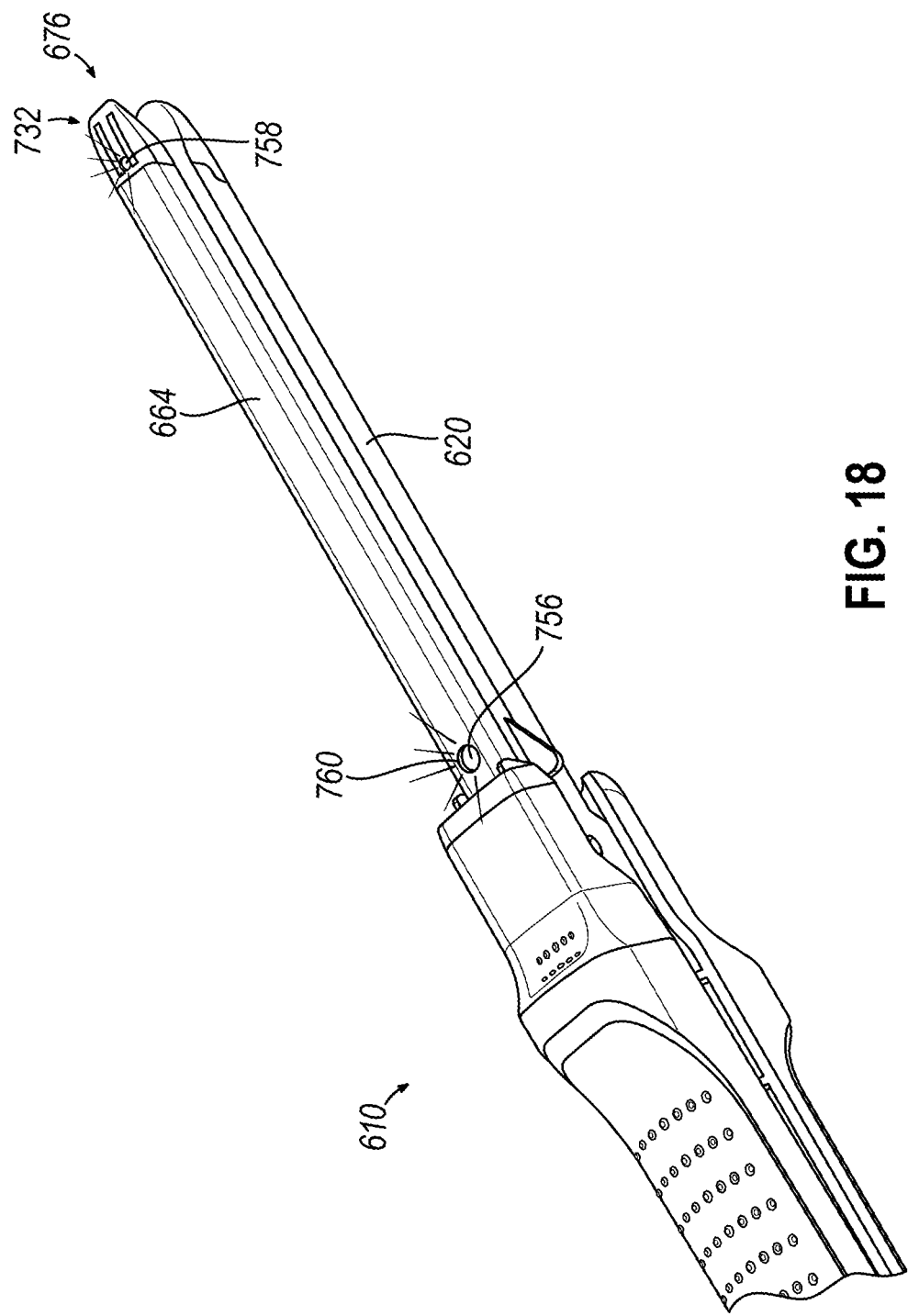
FIG. 18 depicts a perspective view of a distal end of another illustrative linear surgical stapler, showing an anvil insert having a pair of feedback generators.

FIG. 18 shows yet another illustrative linear surgical stapler (610) that is generally similar to linear surgical stapler (210) described above except as otherwise described below. Linear surgical stapler (610) includes distal jaw portions (620, 664) and an anvil insert (676) coupled with distal jaw portion (664). Anvil insert (676) however includes a proximal feedback generator (756) and a distal feedback generator (758) that are each configured to provide at least one of an audible notification and a visual notification on linear surgical stapler (610) with respect to the clamping state of linear surgical stapler (610). Proximal feedback generator (756) is located at a proximal end of an elongate main body (e.g., 330) of anvil insert (676) and distal feedback generator (758) is located on contoured tip (732). Distal jaw portion (664) defines an aperture (760) that is aligned with proximal feedback generator (756) to allow any feedback generated therefrom to project through distal jaw portion (664) for easier observation by a user. Proximal and distal feedback generators (756, 758) are communicatively coupled with a microprocessor (e.g., 338) that is configured to selectively activate the proximal and distal feedback generators (756, 758) as a function of the clamping state of distal jaw portions (620, 664). For example, if tissue (T) is properly clamped between distal jaw portions (620, 664), proximal and distal feedback generators (756, 758) are deactivated or alternatively generate a notification to the user, such as a green light, to indicate to the user that linear surgical stapler (210) is ready to fire. If tissue (T) is improperly clamped such that the deflection of anvil insert (676) exceeds a threshold valve, the proximal and distal feedback generators (756, 758) generate one or more of an audible notification and a visual notification, such as a red light, to indicate to the user that the tissue (T) is improperly clamped and to refrain from firing linear surgical stapler (210) until the tissue (T) is released and reclamped. In some instances, anvil insert (676) can be configured to generate a notification of the clamping status on a nearby console in conjunction with notifications that are generated by proximal and distal feedback generators (756, 758) In these instances, anvil insert (626) can include a wireless communication module (e.g., 344) for communicating with the console. In other instances, the proximal and distal feedback generators (756, 758) may notify the user of the clamping status in lieu of generating an indicator on a nearby console. In these instances, anvil insert (626) may not include a wireless communication module (e.g., 344).

2. Intelligent Anvil Insert Having Alternative Sensor Arrangements

Figure 19:
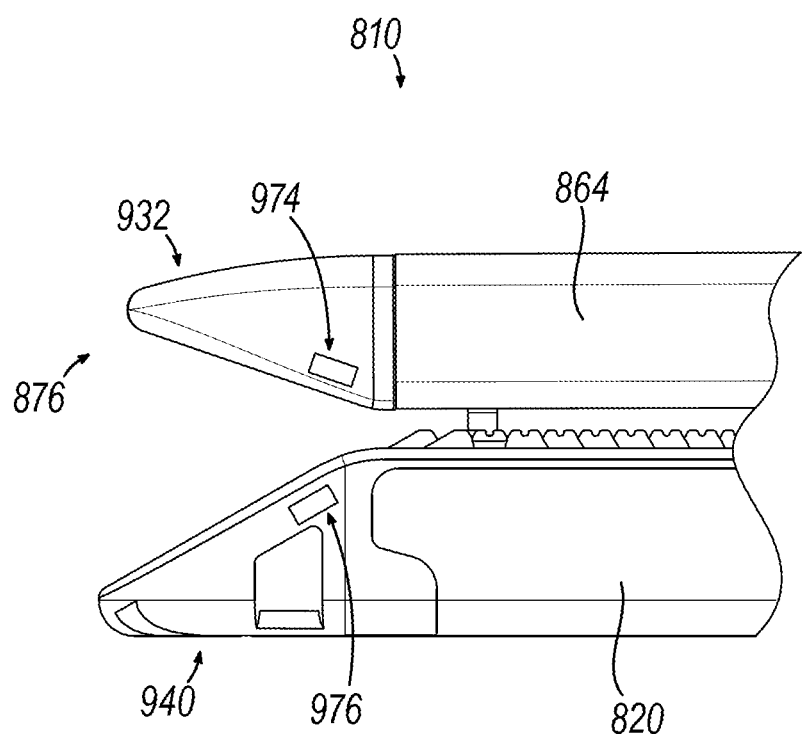
FIG. 19 depicts an enlarged side elevational view of distal jaw portions of another illustrative linear surgical stapler.

FIG. 19 shows yet another illustrative linear surgical stapler (810) that is generally similar to linear surgical stapler (210) described above except as otherwise described below. Linear surgical stapler (810) includes distal jaw portions (820, 864), a staple cartridge (940) supported by distal jaw portion (820), and an anvil insert (876) supported by distal jaw portion (864). Anvil insert (876), however, includes a hall effect sensor (974) provided in a contoured tip (932) and that cooperates with a magnet (976) to facilitate measurement of a distance between the contoured tip (932) and the staple cartridge (840). Anvil insert can accordingly be configured to facilitate detection of improper clamping as a function of the distance between contoured tip (932) and staple cartridge (840). For example, if the distance between hall effect sensor (974) and magnet (976) exceeds a predefined distance when tissue is clamped between distal jaw portions (820, 864), anvil insert (876) facilitates generation of a notification to a user to refrain from firing linear surgical stapler (810) before releasing tissue (T) and reclamping.

Anvil insert (876) can further be configured to utilize the hall effect sensor (974) to facilitate detection of the presence of the stapling cartridge (940) and/or the type of staple cartridge that is supported on distal jaw portion (820). For example, each different type of staple cartridge (e.g., 840) that can be utilized with linear surgical stapler (810) can include a magnet that has a specific magnetic field or other properties that distinguishes one type of staple cartridge from the other types of staple cartridges. When a particular type of staple cartridge is installed on the distal jaw portion (820), anvil insert (876) can recognize the type of cartridge that is installed as a function of the magnet detected by the hall effect sensor (974). Anvil insert can accordingly notify a user of the type of cartridge that is installed to allow the user to confirm that the proper staple cartridge is being used for a given application. In addition, when staple cartridge (840) is not installed on distal jaw portion (820), hall effect sensor (974) detects the absence of the magnet (976) such that anvil insert (876) can generate a notification to a user indicating that a staple cartridge needs to be installed.

Figure 20:
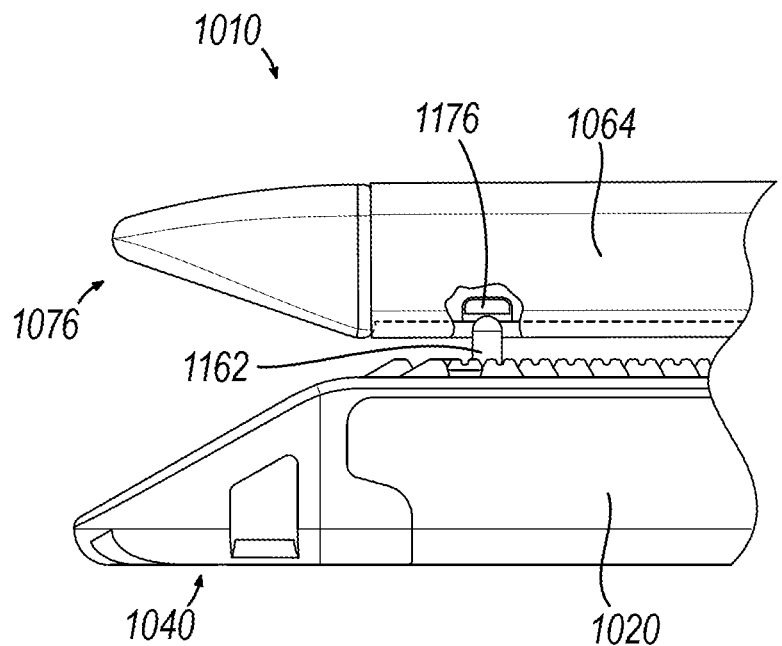
FIG. 20 depicts an enlarged side elevational view of distal jaw portions of another illustrative linear surgical stapler.

FIG. 20 shows yet another illustrative linear surgical stapler (1010) that is generally similar to linear surgical stapler (210) described above except as otherwise described below. Linear surgical stapler (1010) includes distal jaw portions (1020, 1064), a staple cartridge (1040) supported by distal jaw portion (1020), and an anvil insert (1076) supported by distal jaw portion (1064). Anvil insert (1076), however, includes a load cell (1176) that is aligned with tissue gap post (1162) provided at a distal end of staple cartridge (1040). Load cell (1176) is configured to detect contact with tissue gap post (1162). Anvil insert (1076) can accordingly be configured to facilitate detection of improper clamping as a function of whether tissue gap post (1162) is contacting load cell (1176). For example, if tissue gap post (1162) is not contacting load cell (1176), anvil insert (1076) facilitates generation of a notification to a user to refrain from firing linear surgical stapler (1010) before releasing tissue (T) and reclamping.

Figure 21:
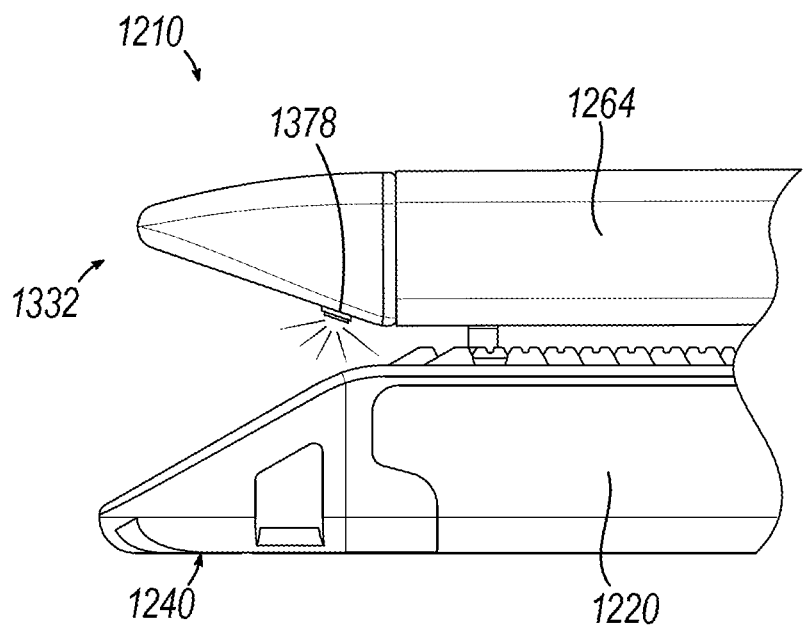
FIG. 21 depicts an enlarged side elevational view of distal jaw portions of another illustrative linear surgical stapler.

FIG. 21 shows yet another illustrative linear surgical stapler (1210) that is generally similar to linear surgical stapler (210) described above except as otherwise described below. Linear surgical stapler (1210) includes distal jaw portions (1220, 1264), a staple cartridge (1240) supported by distal jaw portion (1220), and an anvil insert (1276) supported by distal jaw portion (1264). Anvil insert (1276), however, includes a color sensor (1378) that is provided in a contoured tip (1332) and is configured to detect a color of staple cartridge (1240). When a particular type of staple cartridge is installed on the distal jaw portion (1220), anvil insert (1276) can recognize the type of cartridge that is installed as a function of the color detected by the color sensor (1378). Anvil insert (1276) can accordingly notify a user of the type of cartridge that is installed to allow the user to confirm that the proper staple cartridge is being used for a given application.

FIG. 21 shows yet another illustrative linear surgical stapler (1210) that is generally similar to linear surgical stapler (210) described above except as otherwise described below. Linear surgical stapler (1210) includes distal jaw portions (1220, 1264), a staple cartridge (1240) supported by distal jaw portion (1220), and an anvil insert (1276) supported by distal jaw portion (1264). Anvil insert (1276), however, includes a color sensor (1378) that is provided in a contoured tip (1332) and is configured to detect a color of staple cartridge (1240). When a particular type of staple cartridge is installed on the distal jaw portion (1220), anvil insert (1276) can recognize the type of cartridge that is installed as a function of the color detected by the color sensor (1378). Anvil insert (1276) can accordingly notify a user of the type of cartridge that is installed to allow the user to confirm that the proper staple cartridge is being used for a given application.

FIGS. 22-23 show yet another illustrative linear surgical stapler (1410) that is generally similar to linear surgical stapler (210) described above except as otherwise described below. Linear surgical stapler (1410) includes distal jaw portions (1420, 1464), a staple cartridge (1440) supported by distal jaw portion (1420), and an anvil insert (1476) supported by distal jaw portion (1464). Anvil insert (1476), however, includes an array of position sensors (1580) that are disposed in a slot (1534) and distributed along the length of anvil insert (1476). Position sensors (1580) are configured to detect the position of a knife member (1526) along various stages of the knife member (1526) travelling through the firing stroke (completed firing stroke shown in FIG. 23). In one example, position sensors (1580) can comprise proximity sensors, but any of a variety of suitable sensors are contemplated. Position sensors (1580) can be utilized to detect the position of the knife member (1526) during firing, the number of times knife member (1526) has been fired, or any of a variety of other clinically relevant information about the firing stroke of knife member (1526).

III. Illustrative Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An apparatus, comprising: (a) an elongate cartridge channel comprising a proximal frame portion and a cartridge distal jaw portion, the cartridge distal jaw portion being configured to releasably receive a staple cartridge; (b) an anvil assembly comprising an elongate anvil channel and an anvil insert, the elongate anvil channel comprising a proximal frame portion and an anvil distal jaw portion and the anvil insert being disposed at the anvil distal jaw portion; (c) a clamp member pivotally coupled to the elongate cartridge channel and pivotable between a released position and an actuated position, wherein pivoting of the clamp member from the released position to the actuated position facilitates clamping of patient tissue between the anvil assembly and the elongate cartridge channel; and (d) a deflection sensor associated with the anvil assembly and configured to detect deflection of the anvil assembly to facilitate generation of a notification as a function of the detected deflection.

Example 2

The apparatus of Example 1, wherein the deflection sensor is coupled with the anvil insert.

Example 3

The apparatus of Example 2, wherein the deflection sensor is embedded in the anvil insert.

Example 4

The apparatus of Example 3, wherein the deflection sensor comprises one of a strain gage, a load cell, or a Hall-effect sensor.

Example 5

The apparatus of any of Examples 3 and 4, wherein the anvil assembly comprises a power module that is configured to power the deflection sensor.

Example 6

The apparatus of Example 5, wherein the power module comprises a battery.

Example 7

The apparatus of Example 6, wherein the battery is coupled with the anvil insert.

Example 8

The apparatus of any of the preceding Examples, wherein the deflection sensor is configured to facilitate generation of a notification when the detected deflection exceeds a threshold value.

Example 9

The apparatus of any of the preceding Examples, further comprising an indicator that is configured to generate the notification.

Example 10

The apparatus of Example 9, wherein the indicator comprises one or more of a light and a speaker.

Example 11

The apparatus of any of Examples 9 and 10, wherein the indicator is coupled with the anvil insert.

Example 12

The apparatus of Example 11, wherein the elongate anvil channel defines an aperture that is substantially aligned with the indicator.

Example 13

The apparatus of any of the preceding Examples, wherein: (i) the clamp member comprises a pair of opposed jaws that extend distally from a distal end of the clamp member, (ii) each of the opposed jaws defines a curved slot, and (iii) pivoting of clamp member from the released position to the actuated position facilitates capturing of a pair of latch pins of the elongate anvil channel within the opposed jaws to facilitate clamping of the anvil assembly against the elongate cartridge channel.

Example 14

The apparatus of any of the preceding Examples, further comprising a gap spacing pin that extends from the elongate cartridge channel towards the anvil assembly, wherein the gap spacing pin is configured to space the anvil assembly and the elongate cartridge channel from each other by a predetermined distance, when the anvil assembly is clamped against the elongate cartridge channel.

Example 15

The apparatus of any of the preceding Examples, wherein the elongate anvil channel is configured to interact with staples from the staple cartridge and the anvil insert defines a slot that is configured to accommodate a knife.

Example 16

An apparatus, comprising: (a) an elongate cartridge channel comprising a proximal frame portion and a cartridge distal jaw portion, the cartridge distal jaw portion being configured to releasably receive a staple cartridge; (b) an anvil assembly comprising an elongate anvil channel and an anvil insert, the elongate anvil channel comprising a proximal frame portion and an anvil distal jaw portion and the anvil insert being disposed at the anvil distal jaw portion; (c) a clamp member pivotally coupled to the elongate cartridge channel and pivotable between a released position and an actuated position, wherein pivoting of the clamp member from the released position to the actuated position facilitates clamping of patient tissue between the anvil assembly and the elongate cartridge channel; (d) a strain gage embedded in the anvil insert and configured to detect deflection of the anvil insert; (e) an indicator coupled with the anvil insert and configured to generate a notification as a function of the detected deflection; and (f) a battery coupled with the anvil insert and configured to power the strain gage and the indicator.

Example 17

The apparatus of Example 16, wherein the indicator is configured to generate a notification when the detected deflection exceeds a threshold value.

Example 18

The apparatus of any of Examples 16 and 17, wherein the indicator comprises one or more of a light and a speaker.

Example 19

The apparatus of Example 18, wherein the elongate anvil channel defines an aperture that is substantially aligned with the indicator.

Example 20

An anvil insert for a linear surgical stapler, the anvil insert comprising: (a) an elongate main body that defines an elongate slot for accommodating a knife; (b) a tip disposed at a distal end of the elongate main body; (c) a deflection sensor coupled with the elongate main body and configured to detect deflection of the elongate main body; (d) an indicator coupled with the tip and configured to generate a notification when the detected deflection exceeds a threshold value; and (e) a battery coupled with the anvil insert and configured to power the deflection sensor and the indicator.

IV. Miscellaneous

It should be understood that any one or more of the teachings, expressions, embodiments, examples, etc.

described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

The surgical instrument systems described herein have been described in connection with the deployment and deformation of staples; however, the embodiments described herein are not so limited. Various embodiments are envisioned which deploy fasteners other than staples, such as clamps or tacks, for example. Moreover, various embodiments are envisioned which utilize any suitable means for sealing tissue. For instance, an end effector in accordance with various embodiments can comprise electrodes configured to heat and seal the tissue. Also, for instance, an end effector in accordance with certain embodiments can apply vibrational energy to seal the tissue.

Versions of the devices described above may be designed to be disposed of after a single use, or they can be designed to be used multiple times. Versions may, in either or both cases, be reconditioned for reuse after at least one use. Reconditioning may include any combination of the steps of disassembly of the device, followed by cleaning or replacement of particular pieces, and subsequent reassembly. In particular, some versions of the device may be disassembled, and any number of the particular pieces or parts of the device may be selectively replaced or removed in any combination. Upon cleaning and/or replacement of particular parts, some versions of the device may be reassembled for subsequent use either at a reconditioning facility, or by an operator immediately prior to a procedure. Those skilled in the art will appreciate that reconditioning of a device may utilize a variety of techniques for disassembly, cleaning/replacement, and reassembly. Use of such techniques, and the resulting reconditioned device, are all within the scope of the present application.

By way of example only, versions described herein may be sterilized before and/or after a procedure. In one sterilization technique, the device is placed in a closed and sealed container, such as a plastic or TYVEK bag. The container and device may then be placed in a field of radiation that can penetrate the container, such as gamma radiation, x-rays, or high-energy electrons. The radiation may kill bacteria on the device and in the container. The sterilized device may then be stored in the sterile container for later use. A device may also be sterilized using any other technique known in the art, including but not limited to beta or gamma radiation, ethylene oxide, or steam.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. An apparatus, comprising:
   (a) a first elongate body having a distal portion configured to apply a plurality of staples to patient tissue;
   (b) a second elongate body configured to releasably couple with the first elongate body and having a distal portion configured to form the staples applied by the first elongate body;
   (c) a clamp lever pivotable relative to the first and second elongate bodies between a released position and an actuated position, wherein pivoting of the clamp lever from the released position to the actuated position facilitates clamping of patient tissue between the distal portions of the first and second elongate bodies;
   (d) a deflection sensor associated with the second elongate body and configured to detect deflection of the distal portion of the second elongate body to facilitate generation of a notification as a function of the detected deflection; and
   (e) a power module housed within the second elongate body and configured to power the deflection sensor.

2. The apparatus of claim 1, wherein the distal portion of the second elongate body includes an insert, wherein the deflection sensor is coupled with the insert.

3. The apparatus of claim 2, wherein the deflection sensor is embedded in the insert.

4. The apparatus of claim 3, wherein the deflection sensor comprises one of a strain gage, a load cell, or a Hall-effect sensor.

5. The apparatus of claim 2, wherein the power module comprises a battery coupled with the insert.

6. The apparatus of claim 2, further comprising an indicator that is configured to generate the notification.

7. The apparatus of claim 6, wherein the indicator comprises one or more of a light and a speaker.

8. The apparatus of claim 6, wherein the indicator is coupled with the insert.

9. The apparatus of claim 8, wherein the elongate anvil channel defines an aperture that is substantially aligned with the indicator.

10. The apparatus of claim 2, wherein the insert defines a slot that is configured to accommodate a knife.

11. The apparatus of claim 1, wherein the power module comprises a battery.

12. The apparatus of claim 1, wherein the deflection sensor is configured to facilitate generation of a notification when the detected deflection exceeds a threshold value.

13. The apparatus of claim 1, wherein:
   (i) the clamp lever comprises a pair of opposed jaws that extend distally from a distal end of the clamp lever,
   (ii) each of the opposed jaws defines a curved slot, and
   (iii) pivoting of clamp lever from the released position to the actuated position facilitates capturing of a pair of latch pins of the second elongate body within the opposed jaws to facilitate clamping of the first and second elongate bodies.

14. The apparatus of claim 1, further comprising a gap spacing pin that extends from the distal portion of the first elongate body towards the distal portion of the second elongate body, wherein the gap spacing pin is configured to space the distal portions from each other by a predetermined distance when the first and second elongate bodies are clamped together.

15. An apparatus, comprising:
(a) an elongate cartridge channel comprising a proximal frame portion and a cartridge distal jaw portion, the cartridge distal jaw portion being configured to releasably receive a staple cartridge;
(b) an anvil assembly comprising an elongate anvil channel and an anvil insert, the elongate anvil channel comprising a proximal frame portion and an anvil distal jaw portion and the anvil insert being disposed at the anvil distal jaw portion;
(c) a clamp member pivotally coupled to the elongate cartridge channel and pivotable between a released position and an actuated position, wherein pivoting of the clamp member from the released position to the actuated position facilitates clamping of patient tissue between the anvil assembly and the elongate cartridge channel;
(d) a strain gage embedded in the anvil insert and configured to detect deflection of the anvil insert;
(e) an indicator coupled with the anvil insert and configured to generate a notification as a function of the detected deflection; and
(f) a battery secured to the anvil insert and configured to power the strain gage and the indicator.

16. The apparatus of claim 15, wherein the indicator is configured to generate a notification when the detected deflection exceeds a threshold value.

17. The apparatus of claim 16, wherein the indicator comprises one or more of a light and a speaker.

18. The apparatus of claim 17, wherein the elongate anvil channel defines an aperture that is substantially aligned with the indicator.

19. An anvil insert for a linear surgical stapler, the anvil insert comprising:
(a) an elongate main body that defines an elongate slot for accommodating a knife;
(b) a tip disposed at a distal end of the elongate main body;
(c) a deflection sensor coupled with the elongate main body and configured to detect deflection of the elongate main body;
(d) an indicator coupled with the tip and configured to generate a notification when the detected deflection exceeds a threshold value; and
(e) a battery secured to the anvil insert and configured to power the deflection sensor and the indicator.

* * * * *